(12) United States Patent
Ito et al.

(10) Patent No.: US 11,135,971 B2
(45) Date of Patent: Oct. 5, 2021

(54) ILLUMINATING DEVICE

(71) Applicant: TS TECH CO., LTD., Asaka (JP)

(72) Inventors: Takayoshi Ito, Tochigi (JP); Kazumasa Narita, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 16/492,828

(22) PCT Filed: Sep. 26, 2017

(86) PCT No.: PCT/JP2017/034712
§ 371 (c)(1),
(2) Date: Sep. 10, 2019

(87) PCT Pub. No.: WO2018/168033
PCT Pub. Date: Sep. 20, 2018

(65) Prior Publication Data
US 2020/0148104 A1 May 14, 2020

(30) Foreign Application Priority Data

Mar. 16, 2017 (JP) .............................. JP2017-051880
Mar. 16, 2017 (JP) .............................. JP2017-051881
(Continued)

(51) Int. Cl.
*H01L 33/48* (2010.01)
*B60Q 3/267* (2017.01)
(Continued)

(52) U.S. Cl.
CPC ............ *B60Q 3/267* (2017.02); *B60Q 1/0094* (2013.01); *B60Q 3/54* (2017.02); *F21V 19/001* (2013.01);
(Continued)

(58) Field of Classification Search
CPC ..... B60Q 1/2669; B60Q 2400/40; B60Q 3/64
See application file for complete search history.

(56) References Cited

U.S. PATENT DOCUMENTS 7,333,021 B2 * 2/2008 Ieda .................... B60Q 1/2669
340/425.5
7,878,686 B2 2/2011 Suehiro et al.
(Continued)

FOREIGN PATENT DOCUMENTS

| CN | 205026528 U | 2/2016 |
|---|---|---|
| JP | 3058867 U | 6/1999 |

(Continued)

OTHER PUBLICATIONS

Official Communication dated Apr. 3, 2020 issued over the corresponding Chinese Patent Application No. 201780088388.7.

*Primary Examiner* — Andrew J Coughlin
(74) *Attorney, Agent, or Firm* — Carrier Blackman & Associates, P.C.; William D. Blackman; Joseph P. Carrier

(57) ABSTRACT

An illuminating device (14) includes a circuit board (21) that has a wiring pattern on a first face (21a) and a second face (21b) being on a reverse side thereof, a light-emitting element that is mounted on the first face (21a) of the circuit board (21) and has a height (H) projecting from a front face of the circuit board (21), and a holder (22) that supports a reverse face (21b) of the circuit board (21) at a position that is lower than the height (H) of the light-emitting element (24) from a bottom face (27) thereof. Accordingly, the illuminating device that contributes to the versatility of the circuit board can be provided.

10 Claims, 19 Drawing Sheets

(30) Foreign Application Priority Data

Mar. 16, 2017 (JP) .............................. JP2017-051882
Mar. 16, 2017 (JP) .............................. JP2017-051883

(51) Int. Cl.

| | |
|---|---|
| *F21V 29/503* | (2015.01) |
| *F21V 29/70* | (2015.01) |
| *B60Q 3/54* | (2017.01) |
| *B60Q 1/00* | (2006.01) |
| *F21V 19/00* | (2006.01) |
| *F21Y 115/10* | (2016.01) |

(52) U.S. Cl.
CPC ............ *F21V 29/503* (2015.01); *F21V 29/70* (2015.01); *F21Y 2115/10* (2016.08)

(56) References Cited

U.S. PATENT DOCUMENTS

| | | | |
|---|---|---|---|
| 8,220,878 B2 | 7/2012 | Yoshinaga et al. | |
| 8,419,216 B2 | 4/2013 | Wu | |
| 9,301,385 B2 | 3/2016 | Kurebayashi et al. | |
| 2007/0216172 A1* | 9/2007 | Chang ..................... | E05B 85/10 |
| | | | 292/336 |
| 2007/0258258 A1* | 11/2007 | Wang ..................... | E05B 17/10 |
| | | | 362/501 |
| 2008/0290668 A1* | 11/2008 | Ieda ........................ | E05B 81/78 |
| | | | 292/198 |
| 2012/0112227 A1* | 5/2012 | Toyama ................ | H01L 33/647 |
| | | | 257/98 |
| 2013/0094233 A1* | 4/2013 | Ukai ........................ | B60Q 3/51 |
| | | | 362/511 |
| 2015/0091471 A1* | 4/2015 | Shan ........................ | B60Q 1/26 |
| | | | 315/294 |
| 2016/0290592 A1* | 10/2016 | Takahashi ............ | B60Q 1/2669 |
| 2017/0246986 A1* | 8/2017 | Imai ..................... | F21S 43/237 |
| 2018/0187858 A1* | 7/2018 | Serrano .................. | F21V 23/06 |

FOREIGN PATENT DOCUMENTS

| | | |
|---|---|---|
| JP | 2002-232009 A | 8/2001 |
| JP | 2004-031076 A | 1/2004 |
| JP | 2007-150268 A | 6/2007 |
| JP | 2007-220465 A | 8/2007 |
| JP | 2009-123947 A | 6/2009 |
| JP | 2009-246044 A | 10/2009 |
| JP | 2009-277552 A | 11/2009 |
| JP | 2010-086683 A | 4/2010 |
| JP | 2010-103446 A | 5/2010 |
| JP | 2010-109036 A | 5/2010 |
| JP | 2011-061157 A | 3/2011 |
| JP | 2011-070816 A | 4/2011 |
| JP | 2012-043641 A | 3/2012 |
| JP | 2012-086620 A | 5/2012 |
| JP | 2012-089504 A | 5/2012 |
| JP | 2012-089602 A | 5/2012 |
| JP | 2013-004389 A | 1/2013 |
| JP | 2013-180715 A | 9/2013 |
| JP | 2013-254626 A | 12/2013 |
| JP | 2014-082147 A | 5/2014 |
| JP | 2015-220034 A | 12/2015 |
| JP | 2016-117398 A | 6/2016 |
| JP | 2016-207839 A | 12/2016 |

* cited by examiner

FIG.2
(A)
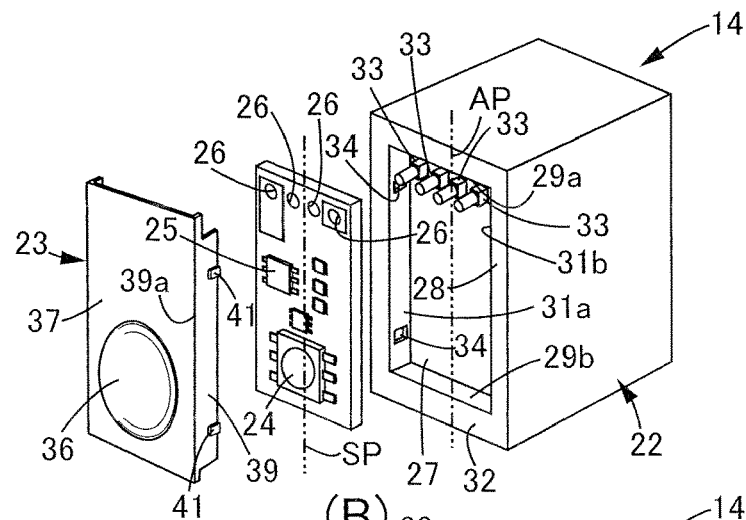
(B)
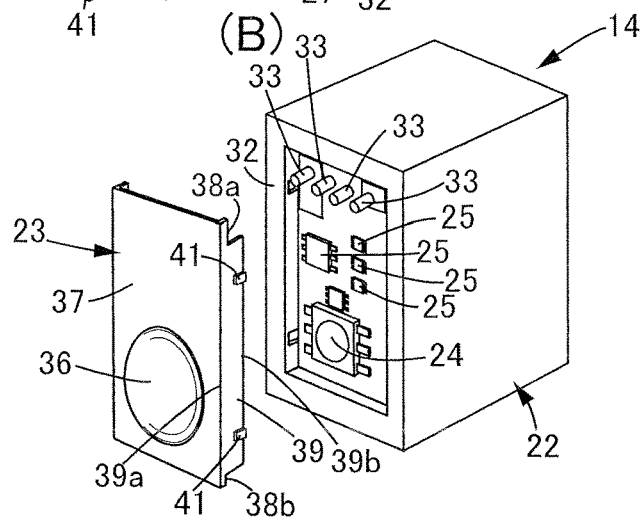
(C)
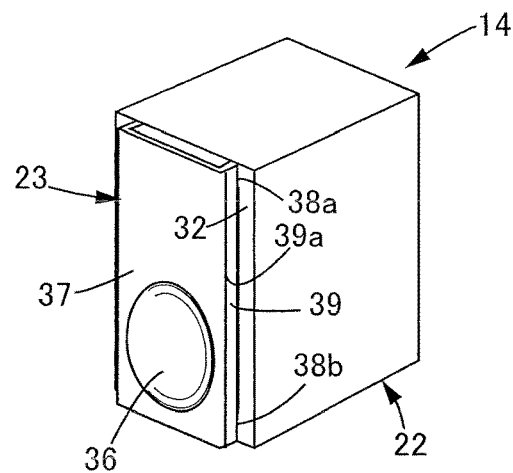

FIG.4
(A)
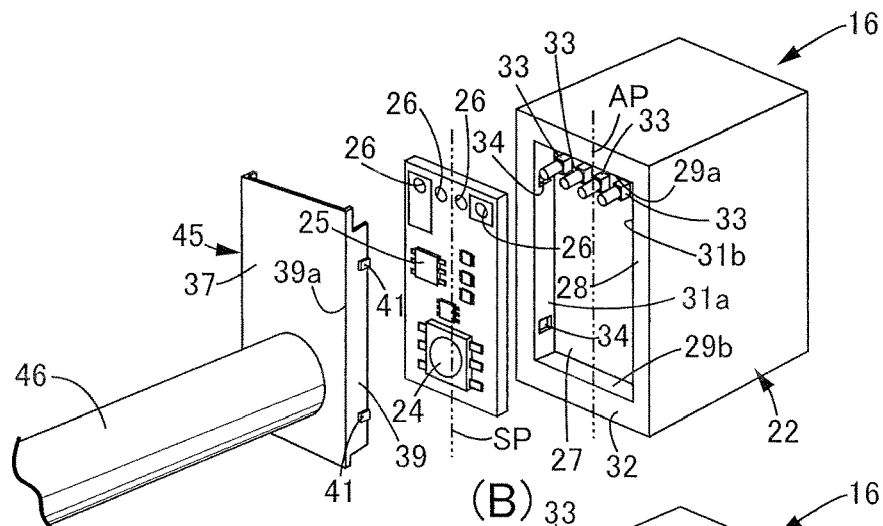
(B)
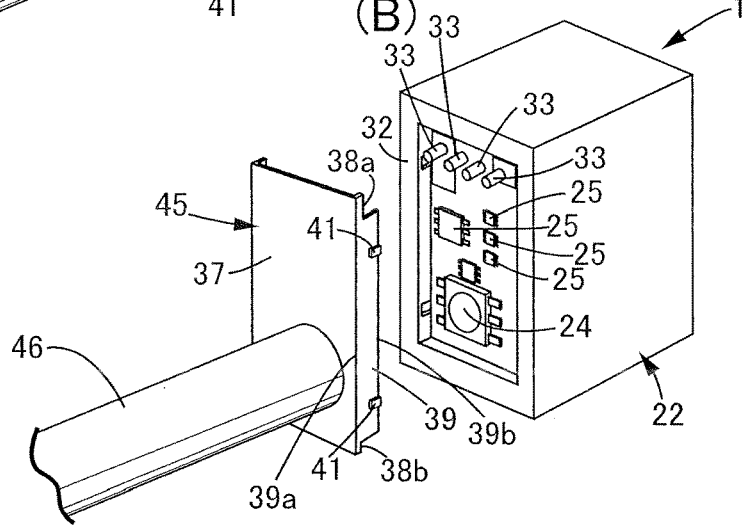
(C)
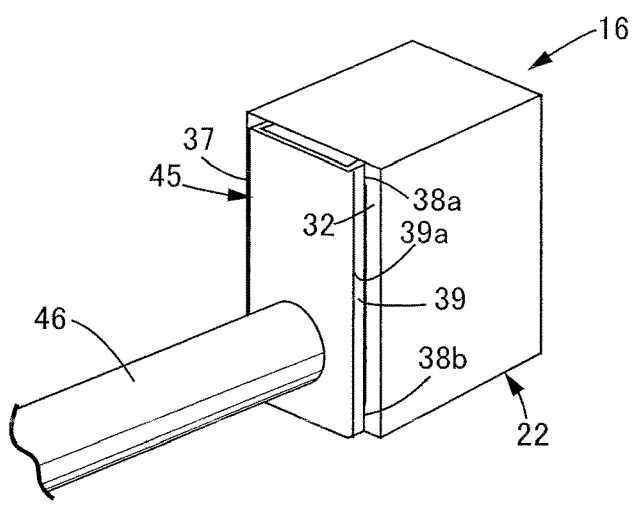

(FIRST FACE)   (SECOND FACE)

FIG.11
(A)
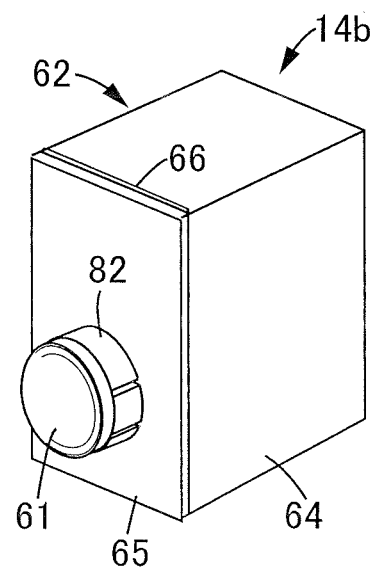
(B)
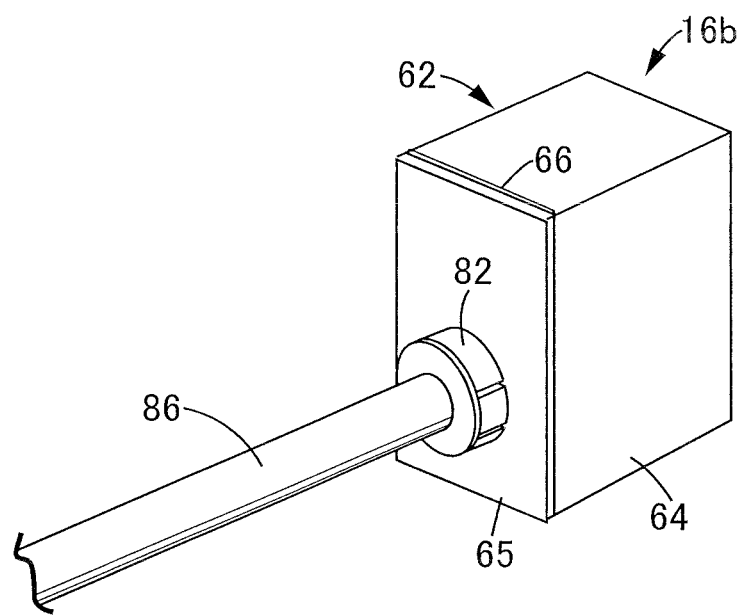

FIG.17
(A)
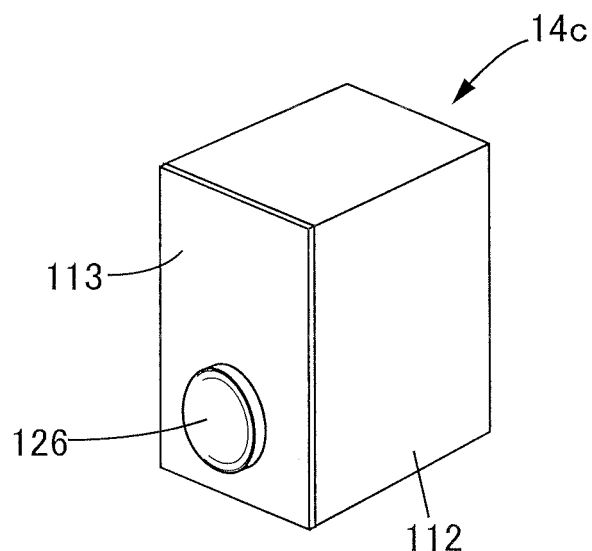
(B)
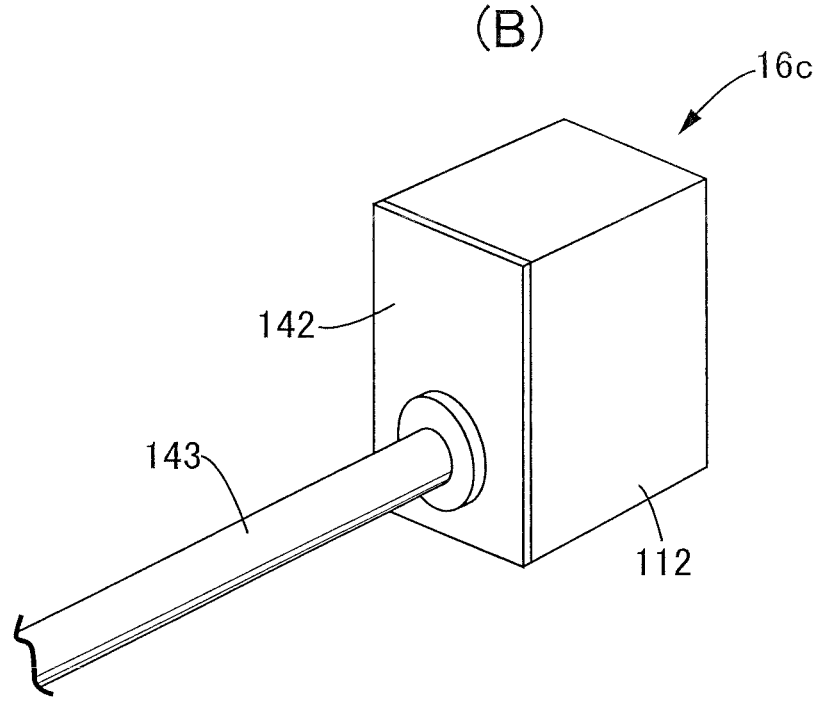

ILLUMINATING DEVICE

TECHNICAL FIELD

The present invention relates to an illuminating device that includes a circuit board, a light-emitting element that is mounted on the circuit board and has a height projecting from a front face of the circuit board, and a holder that supports a reverse face of the circuit board.

BACKGROUND ART

Patent Document 1 discloses a light-emitting device that is used for illuminating a passenger compartment. The light-emitting device includes a circuit board supported on a holder. A light-emitting element (LED element) is mounted on the circuit board.

RELATED ART DOCUMENTS

Patent Documents

Patent Document 1: Japanese Patent Application Laid-open No. 2012-089602

SUMMARY OF THE INVENTION

Problems to be Solved by the Invention

A light-emitting element is mounted on the front side of a circuit board. A conductive foil is disposed on the reverse side of the circuit board. The light-emitting element, an electronic component and a connection terminal are connected to the conductive foil. The conductive foil promotes the dissipation of heat from the light-emitting element or the electronic component. However, the surface area of the circuit board is limited, and more efficient use of the circuit board is desired.

The present invention has been accomplished in light of the above circumstances, and it is an object thereof to provide an illuminating device that contributes to the versatility of a circuit board.

Means for Solving the Problems

According to a first aspect of the present invention, there is provided an illuminating device comprising a circuit board that has a wiring pattern on a first face and a second face, the second face being on a reverse side of the first face, a light-emitting element that is mounted on the first face of the circuit board and has a height projecting from a front face of the circuit board, and a holder that supports a reverse face of the circuit board at a position that is lower than the height of the light-emitting element from a bottom face thereof.

According to a second aspect of the present invention, in addition to the arrangement of the first aspect, the circuit board is superimposed via an entire face on the bottom face of the holder.

According to a third aspect of the present invention, in addition to the arrangement of the second aspect, the wiring pattern has a through hole connected thereto, the through hole being symmetrically disposed with respect to a plane of symmetry that bisects the front face of the circuit board and being connected to a conductive terminal.

According to a fourth aspect of the present invention, in addition to the arrangement of the third aspect, the conductive terminal projects further than a support face that supports the reverse face of the circuit board.

According to a fifth aspect of the present invention, in addition to the arrangement of the fourth aspect, the conductive terminal includes an extremity that has a press-fit shape.

According to a sixth aspect of the present invention, in addition to the arrangement of the fifth aspect, the illuminating device further comprises a cover that is fitted into the holder and sandwiches the circuit board between the cover and the holder.

According to a seventh aspect of the present invention, in addition to the arrangement of any one of the first to sixth aspects, the circuit board is in contact with the holder via the wiring pattern on the reverse side.

According to an eighth aspect of the present invention, an illuminating device is provided that includes a circuit board that has a first face and a second face on a reverse side thereof, a light-emitting element that is mounted on the first face of the circuit board, a holder that covers the first face of the circuit board and has an opening disposed in front of the light-emitting element, and an optical component that is detachably mounted in the opening of the holder.

According to a ninth aspect, in addition to the arrangement of the eighth aspect, the holder includes a main body that receives the second face of the circuit board, and a cover that has the opening, is joined to the main body, and sandwiches the circuit board between the cover and the main body.

According to a tenth aspect, in addition to the arrangement of the ninth aspect, the cover has a tube body that surrounds the opening and detachably receives the optical component based on elastic deformation.

According to an eleventh aspect, in addition to the arrangement of the tenth aspect, the tube body projects from a front face of the cover.

According to a twelfth aspect, in addition to the arrangement of the eleventh aspect, an attachment/detachment mechanism formed into concavo-convex shapes that engage with each other is disposed between the tube body and the optical component.

According to a thirteenth aspect, in addition to the arrangement of the twelfth aspect, the attachment/detachment mechanism has an elastic claw that is defined in the tube body by means of a pair of incisions so as to be displaceable in a radial direction and engages with the optical component.

According to a fourteenth aspect, in addition to the arrangement of the twelfth or thirteenth aspect, the optical component has an optocoupler body that is fitted into the tube body and forms a light guide path for guiding light of the light-emitting element.

According to a fifteenth aspect, in addition to the arrangement of the ninth aspect, the cover has a tube body that surrounds the opening and has on an inner peripheral face thereof a female thread meshing with a male thread of the optical component.

According to a sixteenth aspect, in addition to the arrangement of the fifteenth aspect, the optical component has an optocoupler body that is screwed into the tube body and forms a light guide path for guiding light of the light-emitting element.

According to a seventeenth aspect, in addition to the arrangement of the ninth to sixteenth aspects, the cover is linked integrally to the main body by means of a living hinge.

According to an eighteenth aspect of the present invention, an illuminating device is provided that includes a circuit board that has a wiring pattern on a front face, a light-emitting element that is mounted on a front face of the circuit board and is connected to the wiring pattern, a holder that supports a reverse face of the circuit board, and a heat dissipating body that is formed from a material having a higher thermal conductivity than a thermal conductivity of the holder, is fixed to the holder, and makes contact with the circuit board at a position displaced from the wiring pattern.

According to a nineteenth aspect, in addition to the arrangement of the eighteenth aspect, the heat dissipating body has a projecting part that projects from a face that receives the circuit board and is received by a receiving hole disposed in the circuit board.

According to a twentieth aspect, in addition to the arrangement of the nineteenth aspect, the receiving hole is disposed at a position spaced from the light-emitting element by a distance that is shorter than a distance between the light-emitting element and a through hole connected to a conductive terminal.

According to a twenty-first aspect, in addition to the arrangement of the twentieth aspect, the receiving hole is formed as a pair that are disposed symmetrically with respect to a plane of symmetry bisecting the front face of the circuit board.

According to a twenty-second aspect, in addition to the arrangement of the twenty-first aspect, the heat dissipating bodies, apart from the projecting part, are connected to each other.

According to a twenty-third aspect, in addition to the arrangement of any one of the eighteenth to twenty-second aspects, the heat dissipating body has an extended part that is connected to the projecting part and has a larger surface area than a surface area of the projecting part.

According to a twenty-fourth aspect, in addition to the arrangement of the eighteenth aspect, the heat dissipating body has a front face that spreads flush with a face receiving the circuit board.

According to a twenty-fifth aspect, in addition to the arrangement of the twenty-fourth aspect, the circuit board makes contact with the heat dissipating body via a reverse side of the light-emitting element.

According to a twenty-sixth aspect, in addition to the arrangement of any one of the eighteenth to twenty-fifth aspects, the heat dissipating body is embedded in the holder.

According to a twenty-seventh aspect, in addition to the arrangement of the twenty-sixth aspect, the heat dissipating body is fixed to the holder based on insertion molding.

According to a twenty-eighth aspect of the present invention, a circuit board is provided that includes a substrate, a first wiring pattern that is disposed on a first face of the substrate and realizes a first function in combination with a mounted electronic component, a second wiring pattern that is disposed on a second face on a reverse side of the first face and realizes a second function in combination with a mounted electronic component, the second function being different from the first function, and a via that extends through the substrate and connects the first wiring pattern and the second wiring pattern to each other.

According to a twenty-ninth aspect, in electronic equipment (an illuminating device) that includes the circuit board having the arrangement of the twenty-eighth aspect, the electronic equipment includes an electronic component that is mounted on the first face and has a height projecting from the front face of the substrate, and a holder that supports a reverse face of the substrate at a position lower than a height of the electronic component from a bottom face thereof.

According to a thirtieth aspect, in addition to the arrangement of the twenty-ninth aspect, the circuit board is superimposed via an entire face on the bottom face of the holder.

According to a thirty-first aspect, in addition to the arrangement of the thirtieth aspect, connected to the first wiring pattern and the second wiring pattern is a through hole that is symmetrically disposed with respect to a plane of symmetry bisecting a front face of the substrate and is connected to the conductive terminal.

According to a thirty-second aspect, in addition to the arrangement of the thirty-first aspect, the conductive terminal projects further than a support face supporting the reverse face of the circuit board.

According to a thirty-third aspect, in addition to the arrangement of the thirty-second aspect, the conductive terminal includes an extremity having a press-fit shape.

According to a thirty-fourth aspect, in addition to the arrangement of the thirty-third aspect, the electronic equipment further includes a cover that is fitted onto the holder and sandwiches the circuit board between the cover and the holder.

According to a thirty-fifth aspect, in addition to the arrangement of any one of the twenty-eighth to thirty-fourth aspects, the circuit board makes contact with the holder via the second wiring pattern or the first wiring pattern on the reverse side.

Effects of the Invention

In accordance with the first aspect, when the circuit board is reversed and made to face the bottom face of the holder via the first face, the light-emitting element collides with the bottom face of the holder before the first face of the circuit board is supported by the holder. The circuit board cannot attain a fixed position within the holder. Mixing up of the front and reverse sides of the circuit board having circuit wiring on the two faces can be prevented effectively. Erroneous assembly of the circuit board on the holder can be prevented. Circuit wiring can be formed individually on the front and reverse sides of the circuit board, and the versatility of the circuit board can be realized. The surface area of the circuit board can be exploited to the maximum. When the wiring patterns are formed on the front and reverse sides, mixing up of the two sides in particular easily occurs, and a measure against such erroneous assembly is strongly desired in an assembly site.

In accordance with the second aspect, since the circuit board is superimposed on the bottom face of the holder via a plane across the entire face, the support stability is improved, and the dissipation of heat from the circuit board is enhanced.

In accordance with the third aspect, since the circuit board has the through holes at the same positions when reversed with respect to the plane of symmetry, the conductive terminals can be reliably inserted into the through holes via either the front or reverse sides.

In accordance with the fourth aspect, the conductive terminal can easily be connected to the circuit board.

In accordance with the fifth aspect, the conductive terminal can simply be connected to the circuit board with only the pressure of pressing the circuit board into the holder. Moreover, since the extremity of the conductive terminal is press fitted into the through hole, the conductive terminal can contribute to fixing of the circuit board.

In accordance with the sixth aspect, the circuit board can reliably be retained by the holder. The conductive terminal can prevent displacement of the circuit board.

In accordance with the seventh aspect, heat generated based on the electrical resistance of the wiring pattern is transferred from the wiring pattern to the holder. Heat is dissipated from the holder. The dissipation of heat is thus promoted.

In accordance with the eighth aspect, the optical component can be removed from the holder. The optical component can be replaced. Various types of optical components may be mounted on the holder.

In accordance with the ninth aspect, since the circuit board is sandwiched between the main body and the cover, which are joined to each other, the circuit board can easily be mounted on the holder.

In accordance with the tenth aspect, the optical component can easily be mounted on the cover in response to elastic deformation of the tube body.

In accordance with the eleventh aspect, the optical component can easily be positioned at a mounting position.

In accordance with the twelfth aspect, the optical component can easily be removed from the holder.

In accordance with the thirteenth aspect, the optical component can easily be attached and detached.

In accordance with the fourteenth aspect, even if optical components have different functions, if the optocoupler body is formed in common for the optical components, the optical components can be joined to the tube body regardless of the type.

In accordance with the fifteenth aspect, the optical component can be strongly mounted on the cover based on a screw structure.

In accordance with the sixteenth aspect, even if optical components have different functions, if the optocoupler body is formed in common on the optical components, the optical components can be joined to the tube body regardless of the type.

In accordance with the seventeenth aspect, due to the cover being molded integrally with the main body, the production cost is reduced.

In accordance with the eighteenth aspect, heat generated based on the electrical resistance of the light-emitting element is transferred from the circuit board to the holder along the heat dissipating body and is dissipated from the holder. The heat dissipating body promotes heat transfer from the circuit board to the holder.

In accordance with the nineteenth aspect, the heat dissipating body can be formed with a simple arrangement. The projecting part can be useful for positioning the circuit board.

In accordance with the twentieth aspect, efficient dissipation of heat from the light-emitting element is realized.

In accordance with the twenty-first aspect, efficient dissipation of heat from the light-emitting element is realized.

In accordance with the twenty-second aspect, since the heat dissipating bodies are integrated into one, compared with a case in which they are arranged individually, the heat dissipating bodies can be arranged easily.

In accordance with the twenty-third aspect, heat can be dissipated efficiently from the extended part.

In accordance with the twenty-fourth aspect, the heat dissipating body can make contact with the reverse face of the circuit board over a wide area. In this way, the efficient dissipation of heat from the circuit board is realized.

In accordance with the twenty-fifth aspect, the heat dissipation properties can be further enhanced.

In accordance with the twenty-sixth aspect, heat of the heat dissipating body can be transferred efficiently to the holder. In this way the dissipation of heat from the light-emitting element can be further promoted.

In accordance with the twenty-seventh aspect, the heat dissipating body can easily be fixed to the holder.

In accordance with the twenty-eighth aspect, when an electronic component is mounted on the first wiring pattern of the first face, the electronic component and the wiring pattern form a circuit having a first function. Part of the second wiring pattern on the reverse side functions as a bypass circuit. At the same time, heat generated based on the electrical resistance of the first wiring pattern is transferred from the first wiring pattern to the second wiring pattern on the reverse side and dissipated. The dissipation of heat is promoted. On the other hand, when an electronic component is mounted on the second wiring pattern of the second face, the electronic component and the wiring pattern form a circuit with a second function. Part of the first wiring pattern on the reverse side functions as a bypass circuit. Heat generated based on the electrical resistance of the second wiring pattern is transferred from the second wiring pattern to the first wiring pattern on the reverse side and dissipated. The dissipation of heat is promoted.

In accordance with the twenty-ninth aspect, when the circuit board is reversed and made to face the bottom face of the holder via the first face, the light-emitting element collides with the bottom face of the holder before the first face of the circuit board is supported by the holder. The circuit board cannot attain a fixed position within the holder. Mixing up of the front and reverse sides of the circuit board having a wiring pattern on the two faces can be prevented effectively. Erroneous assembly of the circuit board on the holder can be prevented. The first function and the second function can be realized individually by the front and reverse of the circuit board, and the versatility of the circuit board can be realized. The surface area of the circuit board can be exploited to the maximum. When the wiring patterns are formed on the front and reverse sides, mixing up of the two sides in particular easily occurs, and a measure against such erroneous assembly is strongly desired in an assembly site.

In accordance with the thirtieth aspect, since the circuit board is superimposed on the bottom face of the holder via a plane across the entire face, the support stability is improved, and the dissipation of heat from the circuit board is enhanced.

In accordance with the thirty-first aspect, since the circuit board has the through holes at the same positions when reversed with respect to the plane of symmetry, the conductive terminals can be reliably inserted into the through holes via either the front or reverse sides.

In accordance with the thirty-second aspect, the conductive terminal can easily be connected to the circuit board.

In accordance with the thirty-third aspect, the conductive terminal can simply be connected to the circuit board with only the pressure of pressing the circuit board into the holder. Moreover, since the extremity of the conductive terminal is press fitted into the through hole, the conductive terminal can contribute to fixing of the circuit board.

In accordance with the thirty-fourth aspect, the circuit board can reliably be retained by the holder. The conductive terminal can prevent displacement of the circuit board.

In accordance with the thirty-fifth aspect, heat generated based on the electrical resistance of the wiring pattern on the front side is transferred from the wiring pattern on the reverse side to the holder. Heat is dissipated from the holder. In this way the dissipation of heat is promoted.

BRIEF DESCRIPTION OF DRAWINGS

FIGS. 2(A)-2(C) schematically show the arrangement of a first illuminating device, in which FIG. 2 (A) is an exploded perspective view, FIG. 2 (B) is a perspective view in a state in which a cover is removed, and FIG. 2 (C) is an overall perspective view.

FIGS. 4(A)-4(C) schematically show the arrangement of a second illuminating device, in which FIG. 4 (A) is an exploded perspective view, FIG. 4 (B) is a perspective view in a state in which a cover is removed, and FIG. 4 (C) is an overall perspective view.

FIGS. 11 (A) and 11(B) are overall perspective views schematically showing the arrangement of a second illuminating device.

FIGS. 17 (A) and 17 (B) are overall perspective views schematically showing the arrangement of a second illuminating device.

EXPLANATION OF REFERENCE NUMERALS AND SYMBOLS

Figure 1:
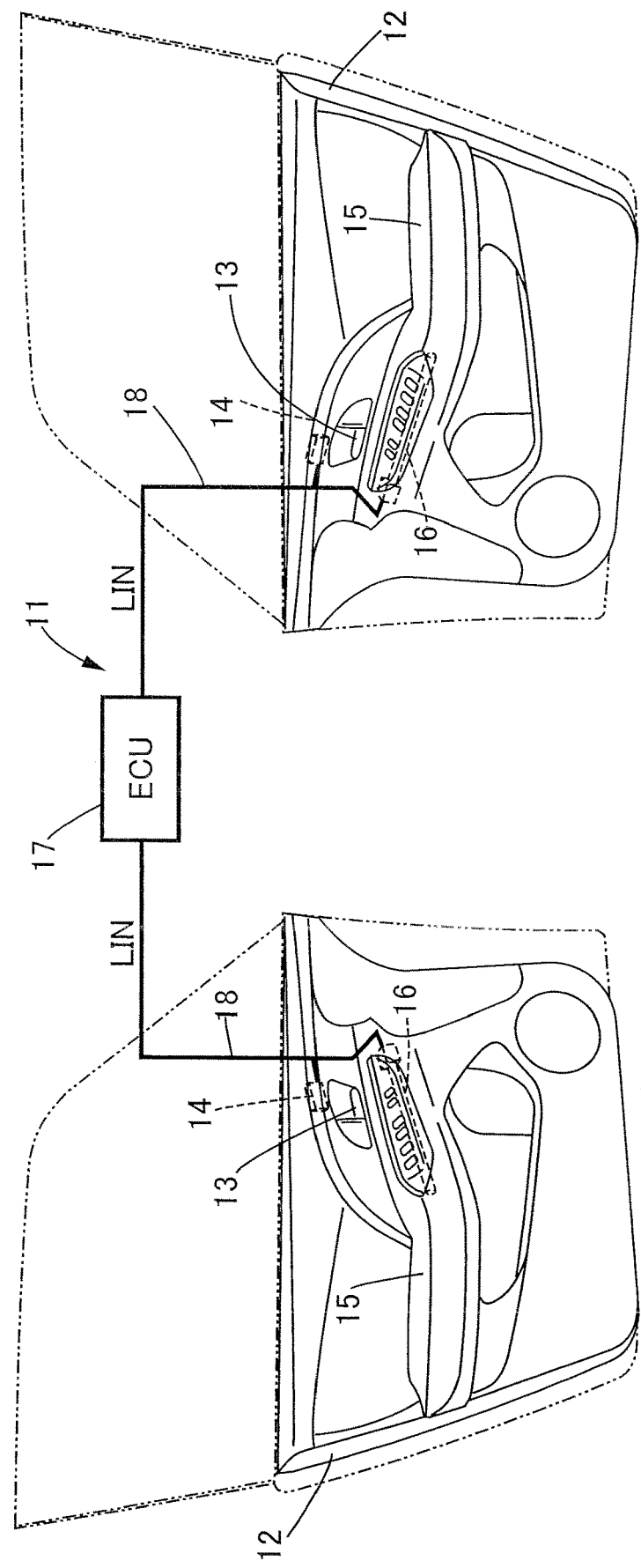
FIG. 1 is a schematic diagram schematically showing a door trim of an automobile.

14 Illuminating device (first illuminating device)
14a Illuminating device (first illuminating device)
14b Illuminating device (first illuminating device)
14c Illuminating device (first illuminating device)
16 Illuminating device (second illuminating device)
16b Illuminating device (second illuminating device)
16c Illuminating device (second illuminating device)
21 Circuit board
21a First face (front face or reverse face)
21b Second face (reverse face or front face)
22 Holder
23 Cover
24 Light-emitting element as electronic component
26 Through hole
27 Bottom face as support face
48a First wiring pattern as wiring pattern (or second wiring pattern)
48b Second wiring pattern as wiring pattern (or first wiring pattern)
51 Via
53 Substrate
56 Bottom face
61 Optical component (lens)
62 Holder
63 Circuit board
63a First face (front face or reverse face)
64 Main body
65 Cover
66 Living hinge
67 Light-emitting element
81 Opening
82 Tube body
86 Optical component (light guide pipe)
87 Optocoupler body
88 Attachment/detachment mechanism
91 Incision
92 Elastic claw
93 Depression
101 Optocoupler body
102 Male thread
103 Female thread
104 Tube body
111 Circuit board
112 Holder
114 Light-emitting element
116 Wiring pattern
116a Through hole
117 Circuit board-receiving face (bottom face)
123 Conductive terminal
132 Heat dissipating body
133 Projecting part (columnar piece)
134 Receiving hole
139 Extended part
144 Heat dissipating body
144a Front face
H Height
SP Plane of symmetry (of circuit board)

MODES FOR CARRYING OUT THE INVENTION

Several embodiments of the present invention are explained below by reference to the attached drawings.

(1) Illuminating Device Related to First Embodiment

FIG. 1 schematically shows the arrangement of an illumination system mounted on an automobile. An illumination system 11 includes a first illuminating device 14 that is embedded in each of left and right door trims 12 and, when turned ON, illuminates a door inside handle 13, and a second illuminating device 16 that is embedded in each of left and right door arm rests 15 and, when turned ON, illuminates the edge of the door arm rest 15. The first illuminating device 14 and the second illuminating device 16 are connected to a control unit (ECU) 17 of the automobile via LIN communication. The control unit 17 controls the turning ON and OFF of the first illuminating device 14 and the second illuminating device 16. In accordance with LIN communication, the first illuminating device 14 and the second illuminating device 16 can be connected in series or in parallel via one wire harness 18 when connected to the control unit 17.

As shown in FIG. 2, the first illuminating device 14 includes a rectangular column-shaped holder 22 supporting a circuit board 21, and a cover 23 embedded in the holder 22 and sandwiching the circuit board 21 between itself and the holder 22. The holder 22 and the cover 23 are formed from for example an insulating resin molding. The holder 22 is fixed to a material forming the door trim 12.

One light-emitting element 24 and one or more electronic components 25 contributing to light emission of the light-emitting element 24 are mounted on the front face of the circuit board 21. The light-emitting element 24 and the electronic component 25 are for example soldered to a wiring pattern, which is described later. When carrying out soldering, for example a reflow step is employed. The light-emitting element 24 is formed from for example an LED (light-emitting diode) element. The LED element performs for example surface emission.

The wiring pattern includes a plurality of (here, four) through holes 26. The through hole 26 is formed from a conductive wall that is continuous from a conductive material of the wiring pattern and surrounds for example a columnar space. The through holes 26 are disposed plane-symmetrically with respect to a plane of symmetry SP that bisects the front face of the circuit board 21. The substrate of the circuit board 21 is molded from for example an insulating resin material or a ceramic material.

The holder 22 has a bottom face (support face) 27 that is formed as a plane and supports the reverse face of the circuit board 21, and a surrounding wall 28 that surrounds the bottom face 27 and projects further forward than the bottom face 27. The bottom face 27 has a shape that is the same as the outline of the circuit board 21. The surrounding wall 28 has a pair of first wall faces 29a and 29b that are orthogonal to the bottom face 27 and face each other in the vertical direction, and a pair of second wall faces 31a and 31b that are orthogonal to the bottom face 27, face each other in the lateral direction, and connect the upper and lower first wall faces 29a and 29b to each other. A flat rectangular parallelepiped space that is in contact with the bottom face 27 is thus defined inside the surrounding wall 28.

Defined on the surrounding wall 28 is a mounting face 32 that spreads in parallel with the bottom face 27 at a position spaced from the bottom face 27 by a specific distance and surrounds the entire periphery of the bottom face 27. A space surrounded by the surrounding wall 28 forms a depression with respect to the mounting face 32. When the circuit board 21 is housed in the depression and the reverse face of the circuit board 21 is superimposed via the entire face on the bottom face 27, the first wall faces 29a and 29b and the second wall faces 31a and 31b make contact with the outer edge of the four sides of the circuit board 21, thus enabling parallel movement of the circuit board 21 in a direction perpendicular to the bottom face 27 to be guided. The holder 22 supports the reverse face of the circuit board 21 by means of the bottom face 27. The bottom face 27 functions as a support face supporting the reverse face of the circuit board 21.

Four conductive terminals 33 project from the bottom face 27. The conductive terminal 33 includes for example a power supply terminal or a signal terminal. The conductive terminal 33 is formed from a linear-shaped conductive material. Individual conductive terminals 33 include an extremity having a so-called press-fit shape. The placement of the four conductive terminals 33 reflects the sequence of the through holes 26 arranged on the front face of the circuit board 21. That is, the four conductive terminals 33 are plane-symmetrically disposed with respect to a plane of symmetry AP bisecting the bottom face 27. When the reverse face of the circuit board 21 is superimposed on the bottom face 27, the conductive terminal 33 extends through the through hole 26. The conductive terminal 33 fixes the circuit board 21 to the bottom face by virtue of the action of press-fitting.

Two, that is, upper and lower, cutouts 34 are defined in each of the second wall faces 31a and 31b. The cutout 34 is recessed from the second wall faces 31a and 31b. The cutout 34 has one end set off further on the bottom face 27 side than a virtual plane that is parallel to the bottom face 27 and is spaced from the bottom face 27 by a distance equal to the thickness of the circuit board 21, and has the other end set off at a position spaced toward the open end side by a specific distance from such a virtual plane.

The cover 23 has a decorative plate 37 equipped with a lens 36. The lens 36 is for example integrated with the decorative plate 37. The cover 23 is optically transparent at least for the lens 36 portion. The decorative plate 37 includes an upper edge region 38a that covers the mounting face 32 on the upper side of the holder 22, and a lower edge region 38b that covers the mounting face 32 on the lower side of the holder 22. Integrally formed with left and right edges of the decorative plate 37 between the upper edge region 38a and the lower edge region 38b is a plate-shaped mounting piece 39 that spreads perpendicularly to the rear from the decorative plate 37. The mounting piece 39 is connected to the edge of the decorative plate 37 via one ridge line 39a and allows a predetermined elastic deformation.

Two, that is, upper and lower, projecting bodies 41 are formed on the outer face of the mounting piece 39. The projecting bodies 41 are disposed at positions corresponding to the individual cutouts 34 of the holder 22. When the cover 23 is fitted into the holder 22, the mounting piece 39 is in contact with the corresponding second wall faces 31a and 31b via a plane. The projecting bodies 41 enter the respective corresponding cutouts 34. The projecting body 41 engages with the cutout 34 and prevents the cover 23 from falling out from the holder 22. A rear end 39b of the mounting piece 39 extends in parallel with the ridge line 39a, makes contact with the front face of the circuit board 21, and sandwiches the circuit board 21 between itself and the bottom face 27 of the holder 22.

Figure 3:
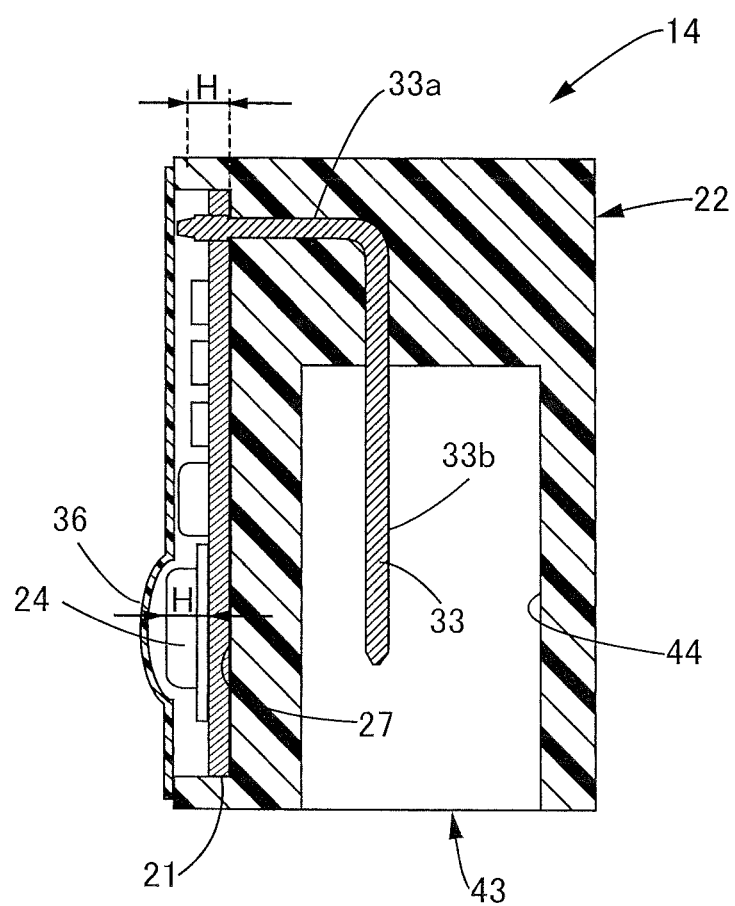
FIG. 3 is an enlarged vertical sectional view of the first illuminating device.

As shown in FIG. 3, the holder 22 supports the reverse face of the circuit board 21 at a position that is lower than a height H of the light-emitting element 24 from the bottom face 27. Here, the circuit board 21 is superimposed via the entire face on the bottom face 27 of the holder 22. The light-emitting element 24 has the height H, which projects from the front face of the circuit board 21. The light-emitting element 24 is covered by the lens 36. Light of the light-emitting element 24 is made to spread by means of the lens 36.

A connector 43 is established on the holder 22. The connector 43 is formed as a female connector. The connector 43 defines a space 44 that receives a male connector. Individual conductive terminals 33 project into the space 44. The conductive terminal 33 has a first linear portion 33a that projects from the bottom face 27 and extends perpendicular to the bottom face 27, and a second linear portion 33b that bends from the first linear portion 33a and extends within the space 44 in parallel with the bottom face 27. The conductive terminal 33 is embedded in the holder 22. When being embedded, for example insertion molding is employed. A male connector joined to the wire harness 18 is inserted into the connector 43. The male connector may be detachably joined to the connector 43.

As shown in FIG. 4, the second illuminating device 16 is formed similarly to the first illuminating device 14. However, in the second illuminating device 16 a light guide pipe 46 is joined to a cover 45 instead of the lens 36. The light guide pipe 46 is formed as a pipe having a circular cross section. The light guide pipe 46 for example guides light in the linear direction and also radiates light in the radial direction of each cross section. The light guide pipe 46 provides linear illumination. Other than the light guide pipe 46 the arrangement is the same as that of the first illuminating device 14.

Figure 5:
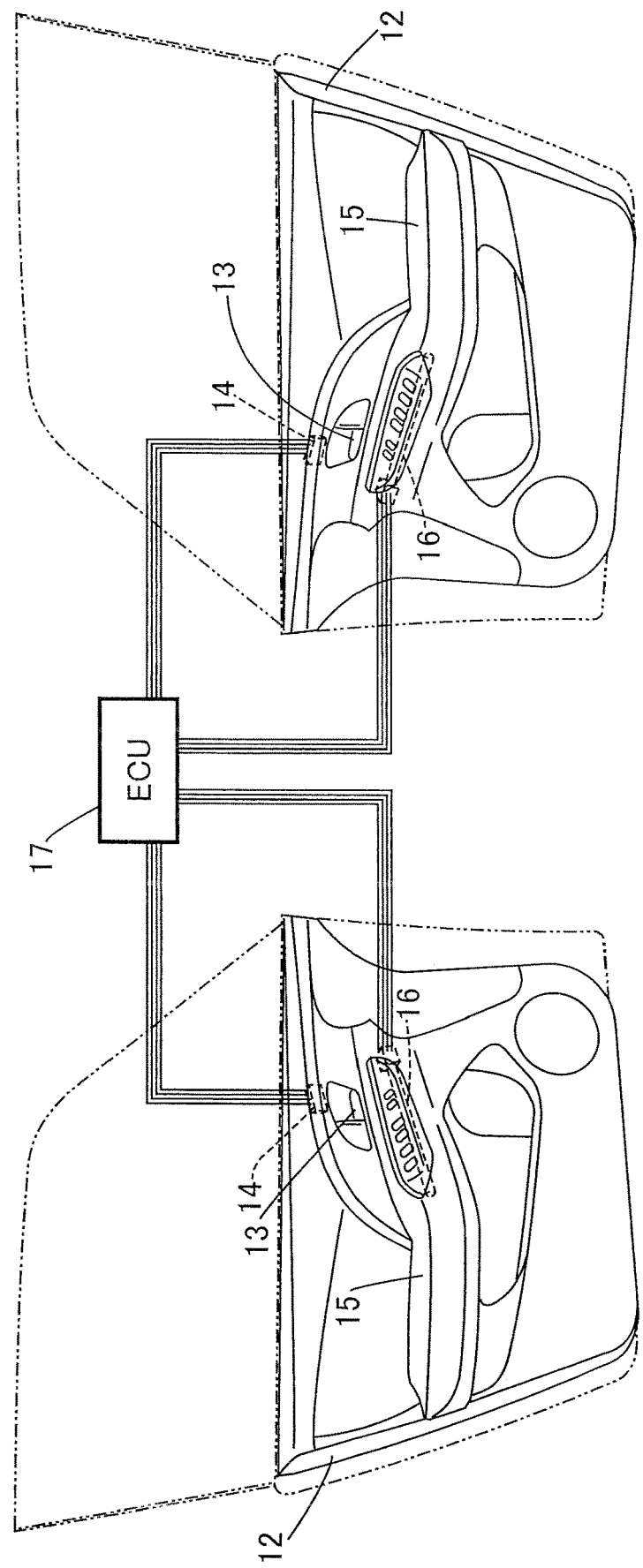
FIG. 5 is a schematic diagram schematically showing a door trim related to another embodiment.

As shown in FIG. 5, the first illuminating device 14 and the second illuminating device 16 may be individually connected to the control unit (ECU) 17 of the automobile. The first illuminating device 14 and the second illuminating device 16 are individually connected to the control unit 17 via a wire harness 47. Here, the control unit 17 individually controls the turning ON and OFF of the first illuminating device 14 and the second illuminating device 16 through separate wiring.

Figure 6:
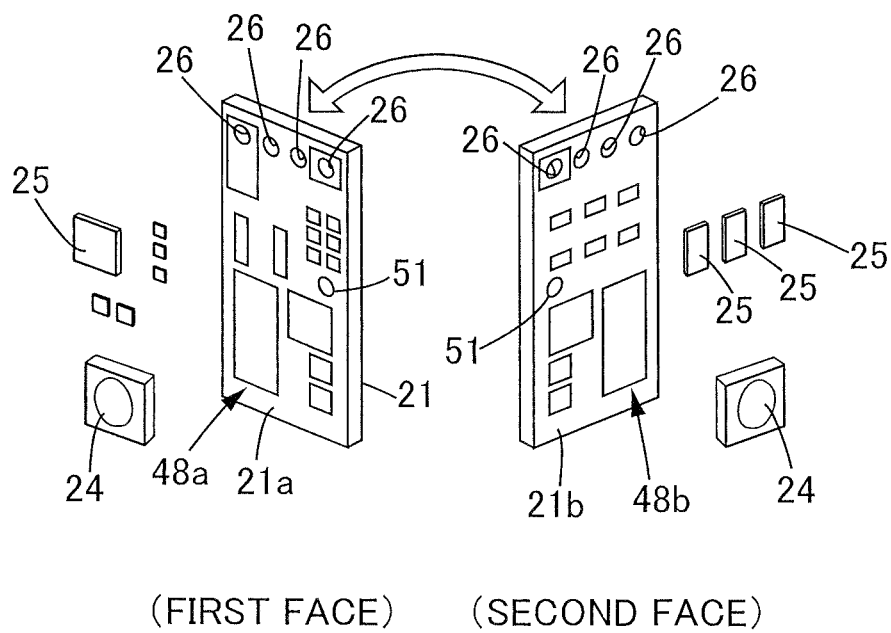
FIG. 6 is an enlarged perspective view schematically showing a first face of a circuit board and a second face, which is the reverse side of the first face.

As shown in FIG. 6, the circuit board 21 has wiring patterns 48a and 48b on the front and reverse sides. The wiring patterns 48a and 48b are formed from for example a conductive material such as copper or aluminum. When forming the wiring patterns 48a and 48b, for example a plating step may be used. Here, the wiring pattern 48a is disposed on a first face 21a of the circuit board 21 so as to correspond to an electronic component 25 for LIN communication. The wiring pattern 48b is disposed on a second face 21b on the reverse side of the first face 21a (either one thereof may be the front and the other may be the reverse) so as to correspond to an electronic component 25 for direct drive. When the circuit board 21 is used in a LIN communication illumination system (FIG. 1), the light-emitting element 24 and the electronic component 25 are mounted on the first face 21a of the circuit board 21, and the wiring pattern 48b of the second face 21b is kept unmounted. No component is mounted on the second face 21b. When the circuit board 21 is used in a direct drive illumination system (FIG. 5), the light-emitting element 24 and the electronic component 25 are mounted on the second face 21b of the circuit board 21. In this process, the wiring pattern 48a of the first face 21a is kept unmounted. No component is mounted on the first face 21a.

The circuit board 21 has a via 51 that connects the wiring pattern 48a on the front side and the wiring pattern 48b on the reverse side to each other. When the light-emitting element 24 and the electronic component 25 are mounted on the first face 21a (front side) of the circuit board 21, part of the wiring pattern 48b of the second face 21b (reverse side) functions as a bypass circuit. When the light-emitting element 24 and the electronic component 25 are mounted on the second face 21b (front side) of the circuit board 21, part of the wiring pattern 48a of the first face 21a (reverse side) functions as a bypass circuit. In either case, the circuit board 21 makes contact with the holder 22 via the wiring patterns 48a and 48b on the reverse side.

Figure 7:
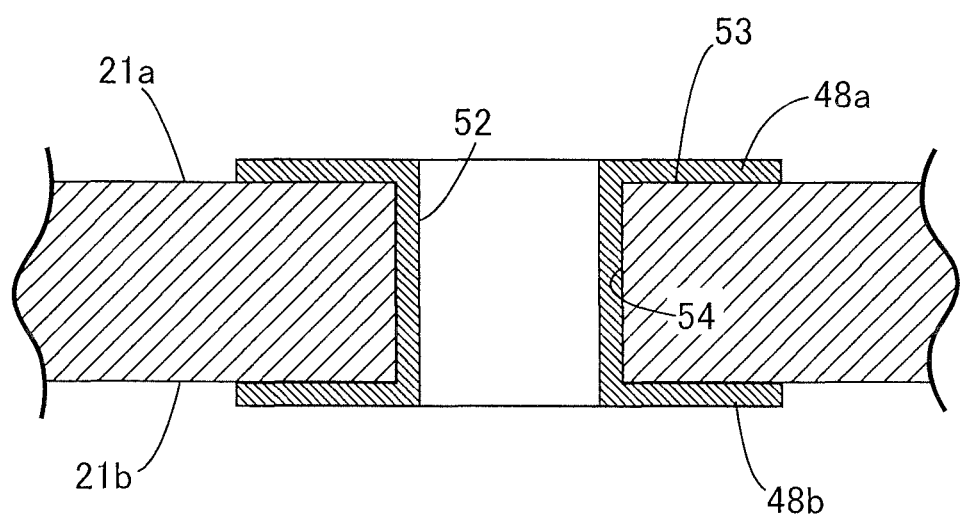
FIG. 7 is an enlarged vertical sectional view schematically showing the structure of a via related to one specific example.

As shown in FIG. 7, the via 51 is formed from a conductive wall 52 that is continuous from the wiring pattern 48a on the front side and the wiring pattern 48b on the reverse side and surrounds for example a columnar shape in the same manner as for the through hole 26. When forming the conductive wall 52, a through hole 54 is bored in a substrate 53 of the circuit board 21 so as to extend through from the wiring pattern 48a on the front side to the wiring pattern 48b on the reverse side. Alternatively, the via 51 may be formed as a solid conductive columnar body instead of such a hollow conductive wall.

The operation of the present embodiment is now explained. When carrying out assembly, the first face 21a or the second face 21b of the circuit board 21 is selected. The light-emitting element 24 and the electronic component 25 are mounted on the selected first face 21a or second face 21b. The circuit board 21 thus formed is incorporated into the holder 22. When incorporated, the circuit board 21 is aligned with the surrounding wall 28 of the holder 22. The second face 21b of the circuit board 21 is made to face the bottom face 27 of the holder 22. The through holes 26 are positioned so as to correspond to individual conductive terminals 33. When the circuit board 21 is pushed into the inside of the surrounding wall 28, movement of the circuit board 21 is guided along the first wall faces 29a and 29b or the second wall faces 31a and 31b. The conductive terminal 33 projects out from the corresponding through hole 26. Conductive connection is ensured between the conductive terminal 33 and the through hole 26. The circuit board 21 is fixed to the holder 22 by virtue of the action of press-fitting.

Subsequently, the cover 23 is fitted into the holder 22. The mounting piece 39 of the cover 23 is positioned on the inside of the surrounding wall 28 of the holder 22. Upper and lower ends of the mounting piece 39 are guided by the first wall faces 29a and 29b of the surrounding wall 28. When the cover 23 is pushed in toward the holder 22, while elastically deforming inwardly the mounting piece 39 makes the projecting body 41 enter the cutout 34 of the second wall faces 31a and 31b. When the rear end 39b of the mounting piece 39 abuts against the front face of the circuit board 21, the projecting body 41 engages with the cutout 34. In this way, the cover 23 is mounted on the holder 22. The circuit board 21 is sandwiched between the holder 22 and the cover 23.

In the present embodiment, when the light-emitting element 24 and the electronic component 25 are mounted on the wiring pattern 48a of the first face 21a, the light-emitting element 24, the electronic component 25, and the wiring pattern 48a form a circuit with a first function for a LIN communication illumination system. Part of the wiring pattern 48b of the second face 21b functions as a bypass circuit. At the same time, heat generated based on the electrical resistance of the wiring pattern 48a is transferred from the wiring pattern 48a to the wiring pattern 48b on the reverse side and dissipated. The dissipation of heat is promoted. On the other hand, when the light-emitting element 24 and the electronic component 25 are mounted on the wiring pattern 48b of the second face 21b, the light-emitting element 24, the electronic component 25, and the wiring pattern 48b form a circuit with a second function for a direct drive illumination system. Part of the wiring pattern 48a of the first face 21a functions as a bypass circuit. Heat generated based on the electrical resistance of the wiring pattern 48b is transferred from the wiring pattern 48b to the wiring pattern 48a on the reverse side and dissipated. The dissipation of heat is promoted.

When the circuit board 21 is reversed and made to face the bottom face 27 of the holder 22 via the first face 21a, the light-emitting element 24 collides with the bottom face 27 of the holder 22 before the first face 21a of the circuit board 21 is supported by the holder 22. The circuit board 21 cannot attain a fixed position within the holder 22. Mixing up of the front and reverse sides of the circuit board 21 having circuit wiring on the two faces can be prevented effectively. Erroneous assembly of the circuit board 21 on the holder 22 can be prevented. Circuit wiring can be formed individually on the front and reverse sides of the circuit board 21, and the versatility of the circuit board 21 can be realized. The surface area of the circuit board 21 can be exploited to the maximum. When the wiring patterns 48a and 48b are formed on the front and reverse sides, mixing up of the two sides in particular easily occurs, and a measure against such erroneous assembly is strongly desired in an assembly site.

In the illuminating devices 14 and 16 the circuit board 21 is superimposed via the entire face on the bottom face 27 of the holder 22. Since the circuit board 21 is superimposed on the bottom face 27 of the holder 22 via a plane across the entire face, the support stability is improved, and the dissipation of heat from the circuit board 21 is enhanced.

Connected to the wiring patterns 48a and 48b are the through holes 26, which are symmetrically disposed with respect to the plane of symmetry SP bisecting the front face of the circuit board 21 and are connected to the conductive terminals 33. Since the circuit board 21 has the through holes 26 at the same positions when reversed with respect to the plane of symmetry SP, the conductive terminals 33 can be reliably inserted into the through holes 26 via either the front or reverse sides.

The conductive terminal 33 projects further than the bottom face 27 (support face) supporting the reverse face 21b (or 21a) of the circuit board 21. The conductive terminal 33 can easily be connected to the circuit board 21.

The conductive terminal 33 includes an extremity having a press-fit shape. The conductive terminal 33 is simply connected to the circuit board 21 with only the pressure of pressing the circuit board 21 into the holder 22. Moreover, since the extremity of the conductive terminal 33 is press fitted into the through hole 26, the conductive terminal 33 can contribute to fixing of the circuit board 21.

The cover 23 is fitted into the holder 22 and sandwiches the circuit board 21 between itself and the holder 22. The circuit board 21 is reliably retained by the holder 22. The conductive terminal 33 prevents displacement of the circuit board 21.

The circuit board 21 has the via 51, which connects the wiring pattern 48a of the front side (here the first face 21a) and the wiring pattern 48b of the reverse side (here the second face 21b) to each other. When the light-emitting element 24 is mounted on the wiring pattern 48a on the front side, part of the wiring pattern 48b on the reverse side functions as a bypass circuit. At the same time, heat generated based on the electrical resistance of the wiring pattern 48a is transferred from the wiring pattern 48a on the front side to the wiring pattern 48b on the reverse side and dissipated. The dissipation of heat is promoted.

The circuit board 21 makes contact with the holder 22 via the wiring pattern 48a on the reverse side. Heat generated based on the electrical resistance of the wiring pattern 48b is transferred from the wiring pattern 48b to the holder 22. Heat is dissipated from the holder 22. The dissipation of heat is thus promoted.

(2) Illuminating Device Related to Second Embodiment

Figure 8:
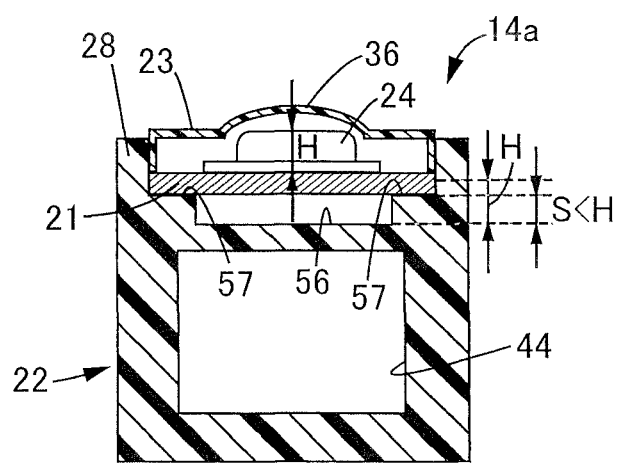
FIG. 8 is an enlarged sectional view of a first illuminating device related to a second embodiment.

FIG. 8 schematically shows a first illuminating device 14a related to a second embodiment. The holder 22 of the first illuminating device 14a supports the reverse face of the circuit board 21 by means of a step face 57 positioned at a position S that is lower than the height H of the light-emitting element 24 from a bottom face 56. The surrounding wall 28 is formed so as to be continuous from the step face 57. The step face 57 for example receives the circuit board 21 along the outer edge of the circuit board 21. A space is defined between the reverse face 21b of the circuit board 21 and the bottom face 56. The arrangement is otherwise the same as that of the first illuminating device 14 described above.

When the circuit board 21 is reversed and made to face the bottom face 56 of the holder 22 via the first face 21a, the light-emitting element 24 collides with the bottom face 56 of the holder 22 before the first face 21a of the circuit board 21 is supported by the step face 57. The circuit board 21 cannot attain a fixed position within the holder 22. Mixing up of the two sides for the circuit board 21 having circuit wiring on the two faces can be prevented effectively. Erroneous assembly of the circuit board 21 on the holder 22 can be prevented.

(3) Illuminating Device Related to Third Embodiment

Figure 9:
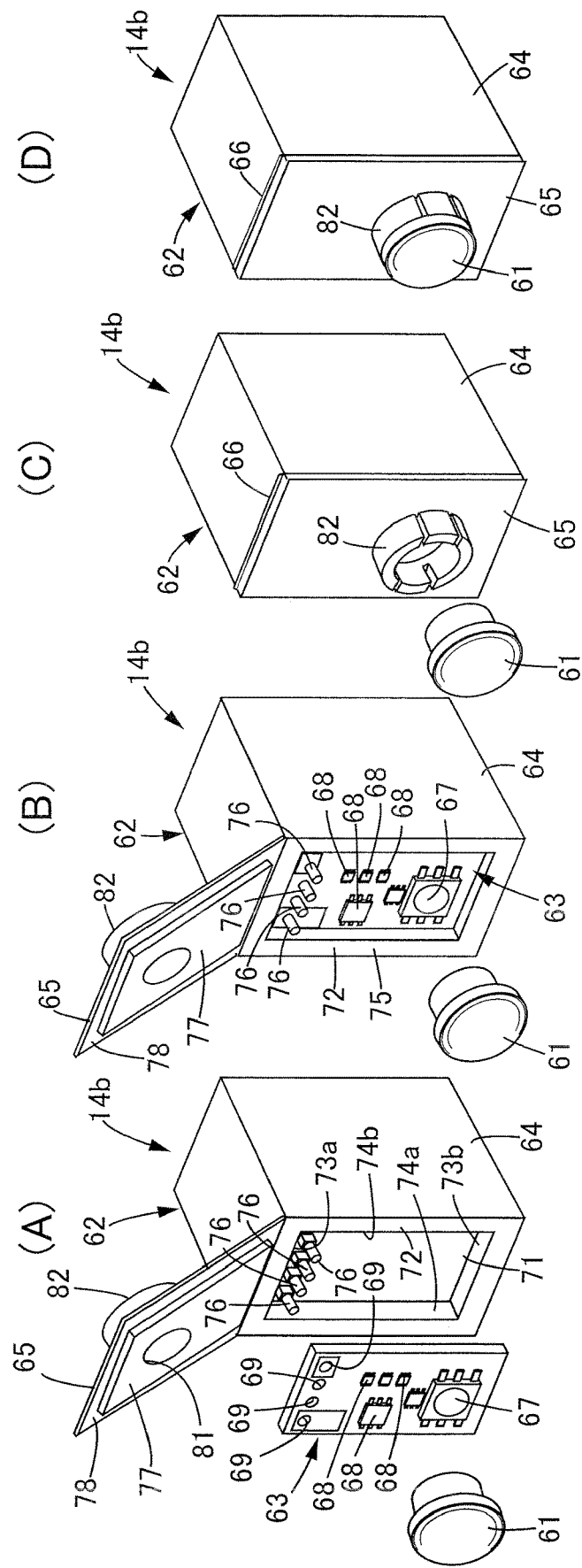
FIGS. 9(A)-9(D) schematically show the arrangement of a first illuminating device related to a third embodiment, in which FIG. 9 (A) is an exploded perspective view, FIG. 9 (B) is a perspective view in a state in which a cover is opened, FIG. 9 (C) is a perspective view in a state in which a lens is removed, and FIG. 9 (D) is an overall perspective view.

As shown in FIG. 9, a first illuminating device 14b includes, on a front face thereof, a holder 62 that supports a lens (optical component) 61. The holder 62 is formed from a rectangular column-shaped main body 64 supporting a circuit board 63, and a cover 65 joined to the main body 64 and sandwiching the circuit board 63 between itself and the main body 64. The main body 64 and the cover 65 are formed from for example an insulating resin molding. Here, the cover 65 is linked integrally to the main body 64 by means of a living hinge 66. The holder 62 is fixed to a material forming the door trim 12.

One light-emitting element 67 and one or more electronic components 68 contributing to light emission of the light-emitting element 67 are mounted on a first face (a front face) of the circuit board 63. The light-emitting element 67 and the electronic component 68 are for example soldered to a wiring pattern. When carrying out soldering, for example a reflow step is employed. The light-emitting element 67 is formed from for example an LED (light-emitting diode) element. The LED element performs for example surface emission.

The wiring pattern includes a plurality of (here, four) through holes 69. The through hole 69 is formed from a conductive wall that is continuous from a conductive material of the wiring pattern and surrounds for example a columnar space. The substrate of the circuit board 63 is molded from for example an insulating resin material or a ceramic material.

The main body 64 of the holder 62 has a bottom face (support face) 71 that is formed as a plane and supports the reverse face (a second face on the reverse side of the first face) of the circuit board 63, and a surrounding wall 72 that surrounds the bottom face 71 and projects further forward than the bottom face 71. The bottom face 71 has a shape that is the same as the outline of the circuit board 63. The surrounding wall 72 has a pair of first wall faces 73a and 73b that are orthogonal to the bottom face 71 and face each other in the vertical direction, and a pair of second wall faces 74a and 74b that are orthogonal to the bottom face 71, face each other in the lateral direction, and connect the upper and lower first wall faces 73*a* and 73*b* to each other. A flat rectangular parallelepiped space that is in contact with the bottom face 71 is defined inside the surrounding wall 72.

Defined on the surrounding wall 72 is a mating face 75 that spreads in parallel with the bottom face 71 at a position spaced from the bottom face 71 by a specific distance and surrounds the entire periphery of the bottom face 71. A space surrounded by the surrounding wall 72 forms a depression with respect to the mating face 75. When the circuit board 63 is housed in the depression and the reverse face of the circuit board 63 is superimposed via the entire face on the bottom face 71, the first wall faces 73*a* and 73*b* and the second wall faces 74*a* and 74*b* make contact with the outer edge of the four sides of the circuit board 63, thus enabling parallel movement of the circuit board 63 in a direction perpendicular to the bottom face 71 to be guided. The holder 62 supports the reverse face of the circuit board 63 by means of the bottom face 71. The bottom face 71 functions as a support face supporting the reverse face of the circuit board 63.

Four conductive terminals 76 project from the bottom face 71. The conductive terminal 76 includes for example a power supply terminal or a signal terminal. The conductive terminal 76 is formed from a linear-shaped conductive material. Individual conductive terminals 76 include an extremity having a so-called press-fit shape. The placement of the four conductive terminals 76 reflects the sequence of the through holes 69 arranged on the front face of the circuit board 63. When the reverse face of the circuit board 63 is superimposed on the bottom face 71, the conductive terminal 76 extends through the through hole 69. The conductive terminal 76 fixes the circuit board 63 to the bottom face 71 by virtue of the action of press-fitting.

The cover 65 covers the first face (front face) of the circuit board 63. A thick plate piece 77 is disposed on the reverse face of the cover 65, the thick plate piece 77 being fitted into the inside of the surrounding wall 72. A frame-shaped superimposing piece 78 is connected to the outer periphery of the thick plate piece 77, the superimposing piece 78 being received by the mating face 75 of the surrounding wall 72. The cover 65 is for example fixed to the mating face 75 of the main body 64 by means of the superimposing piece 78. Fixing may employ for example welding. Alternatively, the thick plate piece 77 may be press fitted into the surrounding wall 72 so as to retain the cover 65 at a closed position.

Figure 10:
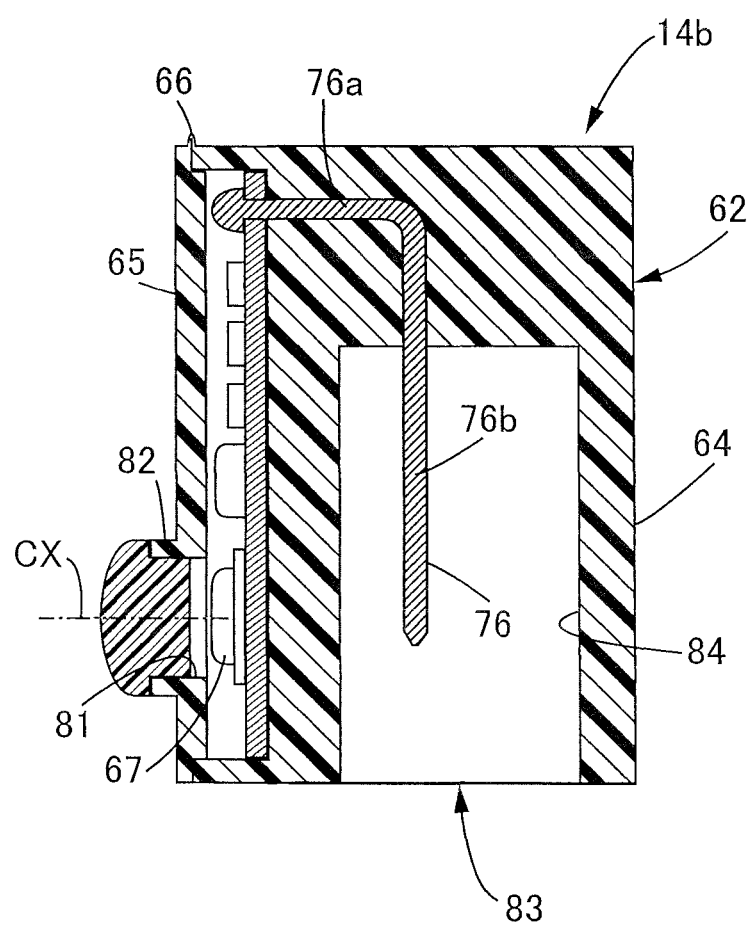
FIG. 10 is an enlarged vertical sectional view of the first illuminating device.

The cover 65 includes a tube body 82 that surrounds an opening 81 and detachably receives the lens 61 based on elastic deformation. The tube body 82 projects from the front face of the cover 65. As shown in FIG. 10, the cover 65 has the opening 81 disposed in front of the light-emitting element 67. The opening 81 has a circular outline that is concentric with an optical axis CX of the light-emitting element 67. The tube body 82 similarly defines a cylindrical space that is coaxial with the optical axis CX of the light-emitting element 67. The optical axis of the lens 61 retained by the tube body 82 overlaps the optical axis CX of the light-emitting element 67.

A connector 83 is established on the main body 64 of the holder 62. The connector 83 is formed as a female connector. The connector 83 defines a space 84 that receives a male connector. The individual conductive terminals 76 project into the space 84. The conductive terminal 76 has a first linear portion 76*a* that projects from the bottom face 71 and extends perpendicular to the bottom face 71, and a second linear portion 76*b* that bends from the first linear portion 76*a* and extends within the space 84 in parallel with the bottom face 71. The conductive terminal 76 is embedded in the main body 64 of the holder 62. When being embedded, for example insertion molding is employed. A male connector joined to the wire harness 18 is inserted into the connector 83. The male connector may be detachably joined to the connector 83.

As shown in FIG. 11, a second illuminating device 16*b* is formed similarly to the first illuminating device 14*b*. However, in the second illuminating device 16*b* a light guide pipe 86 is joined to the tube body 82 of the cover 65 instead of the lens 61. The light guide pipe 86 is formed as a pipe having a circular cross section. The light guide pipe 86 for example guides light in the linear direction and also radiates light in the radial direction of each cross section. The light guide pipe 86 provides linear illumination. Other than the light guide pipe 86 the arrangement is the same as that of the first illuminating device 14*b*.

Figure 12:
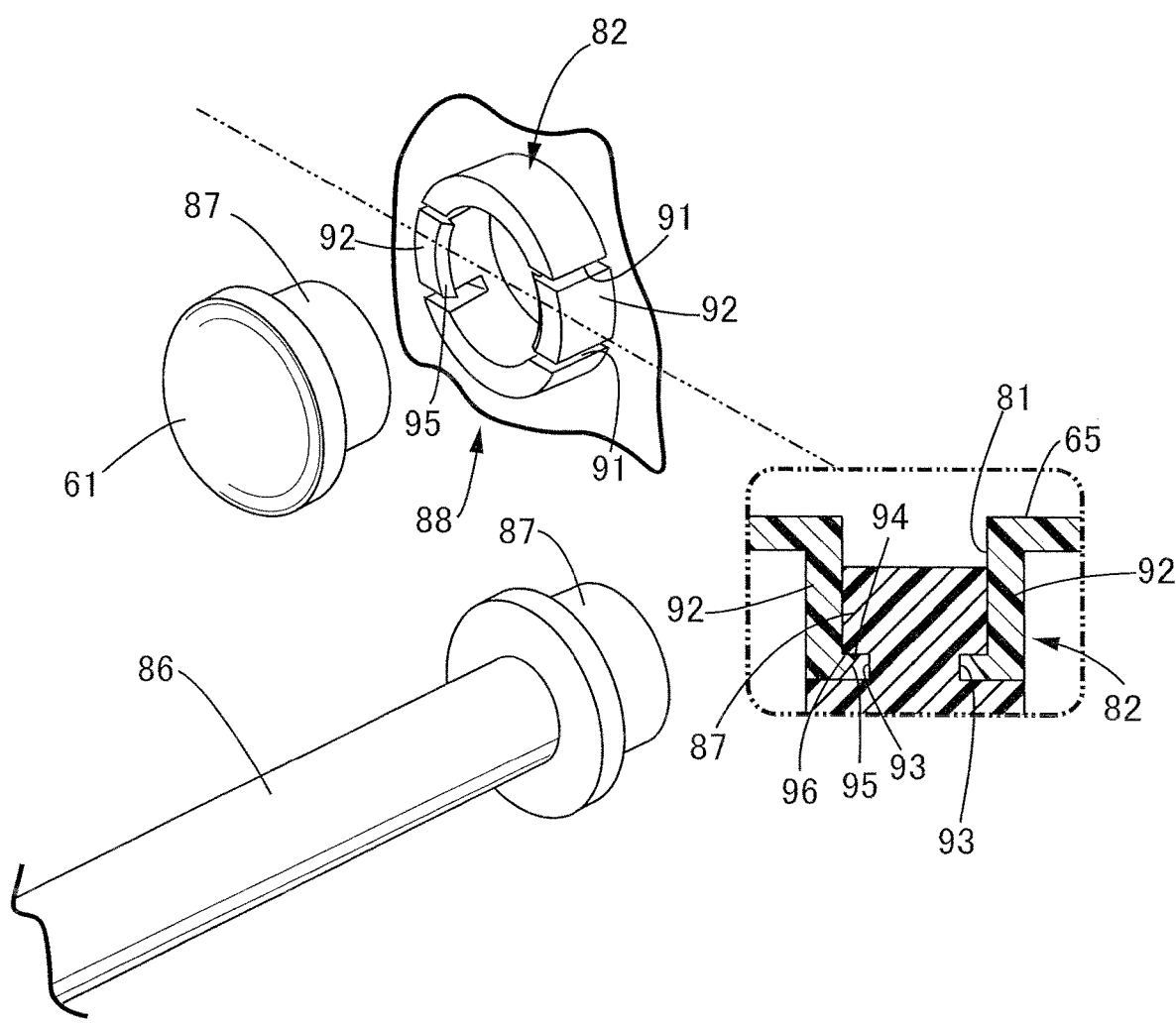
FIG. 12 is an enlarged perspective view schematically showing the arrangement of an attachment/detachment mechanism.

As shown in FIG. 12, an optocoupler body 87 is formed integrally with the lens 61 and the light guide pipe 86, the optocoupler body 87 being fitted into the tube body 82 and forming a light guide path that guides light of the light-emitting element 67. The optocoupler body 87 has an outer periphery with a cylindrical face. The external diameter of the cylindrical face may be set so as to be on the order of the dimension of the internal diameter of the tube body 82.

An attachment/detachment mechanism 88 is disposed between the optocoupler body 87 and the tube body 82, the attachment/detachment mechanism 88 being formed from concavo-convex shapes that engage with each other. The attachment/detachment mechanism 88 has an elastic claw 92 that is defined in the tube body 82 by means of a pair of incisions 91 so as to be displaceable in the radial direction of the tube body 82 and that engages with the optocoupler body 87. Here, the elastic claw 92 is disposed as a pair on a diameter of the tube body 82. A depression 93 receiving the elastic claw 92 is defined in the outer periphery of the optocoupler body 87.

Defined on the extremity of the elastic claw 92 are an engagement face 94 that is formed as a plane orthogonal to the axis of the tube body 82 and faces the opening 81, and an inclined face 95 that is connected to the radially inner end of the engagement face 94 via a ridge line and spreads toward the radially outer side in going away from the opening 81. Defined on the depression 93 is an engagement face 96 that is formed as a plane orthogonal to the axis of the optocoupler body 87 and faces the outer front face of the lens 61 or the light guide pipe 86 side. Due to the engagement face 94 of the elastic claw 92 making plane contact with the engagement face 96 of the optocoupler body 87, the optocoupler body 87 is prevented from falling out from the tube body 82. If the elastic claw 92 undergoes elastic deformation outwardly in the radial direction, the engagement face 94 of the elastic claw 92 becomes detached from the engagement face 96 of the optocoupler body 87. Such release of the engagement enables removal of the lens 61 or the light guide pipe 86 from the tube body 82 to be realized.

The operation of the present embodiment is now explained. When carrying out assembly, the light-emitting element 67 and the electronic component 68 are mounted on the first face of the circuit board 63. The circuit board 63 is incorporated into the main body 64 of the holder 62. The second face of the circuit board 63 is made to face the bottom face 71 of the holder 62. The through holes 69 are positioned so as to correspond to the individual conductive terminals 76. When the circuit board 63 is pushed into the inside of the surrounding wall 72, movement of the circuit board 63 is guided along the first wall faces 73*a* and 73*b* or the second wall faces 74*a* and 74*b*. The conductive terminal 76 projects out from the corresponding through hole 69. Conductive connection between the conductive terminal 76 and the through hole 69 is ensured. The circuit board 63 is fixed to the holder 62 by virtue of the action of press-fitting.

Subsequently, the cover 65 is closed via the living hinge 66. The thick plate piece 77 of the cover 65 is fitted into the inside of the surrounding wall 72. The superimposing piece 78 of the cover 65 is received by the mating face 75 of the surrounding wall 72. Either the lens 61 or the light guide pipe 86 is linked to the tube body 82 of the cover 65. In this arrangement, the extremity of the optocoupler body 87 is in contact with the inclined face 95 of the elastic claw 92. The inclined face 95 generates a driving force toward the radially outer side in response to entry of the optocoupler body 87. The elastic claw 92 undergoes elastic deformation outwardly in the radial direction of the tube body 82 by virtue of the action of the driving force. In this way, the optocoupler body 87 is received by the tube body 82. When the optocoupler body 87 is pushed in and attains a fixed position within the tube body 82, the tip of the elastic claw 92 enters the depression 93 of the optocoupler body 87, and the elastic claw 92 returns to its original shape. The engagement face 94 of the elastic claw 92 engages with the engagement face 96 of the optocoupler body 87. Joining of the optocoupler body 87 and the tube body 82 is completed.

In the present embodiment, an optical component such as the lens 61 or the light guide pipe 86 is detachably mounted on the holder 62. The lens 61 and the light guide pipe 86 can be removed from the holder 62. The lens 61 and the light guide pipe 86 can be replaced. Various types of optical components may be mounted on the holder 62. The holder 62 can be used in common for a various types of optical components.

The holder 62 has the main body 64, which receives the reverse face of the circuit board 63, and the cover 65, which has the opening 81, is joined to the main body 64, and sandwiches the circuit board 63 between itself and the main body 64. Since the circuit board 63 is sandwiched between the main body 64 and the cover 65, which are joined to each other, the circuit board 63 can easily be mounted on the holder 62.

The cover 65 of the holder 62 has the tube body 82, which surrounds the opening 81 and detachably receives the optocoupler body 87 of the lens 61 or the light guide pipe 86 based on elastic deformation. An optical component such as the lens 61 or the light guide pipe 86 can easily be mounted on the cover 65 in response to elastic deformation of the tube body 82.

The tube body 82 of the holder 62 projects from the front face of the cover 65. An optical component such as the lens 61 or the light guide pipe 86 can easily be positioned at a mounting position.

The attachment/detachment mechanism 88, which is formed as concavo-convex shapes that engage with each other, is disposed between the tube body 82 of the cover 65 and the optocoupler body 87 of an optical component. An optical component such as the lens 61 or the light guide pipe 86 can easily be removed from the holder 62.

The attachment/detachment mechanism 88 has the elastic claw 92, which is defined on the tube body 82 by means of a pair of incisions so as to be displaceable in the radial direction and engages with the optocoupler body 87. An optical component such as the lens 61 or the light guide pipe 86 can easily be attached and detached.

An optical component such as the lens 61 or the light guide pipe 86 has the optocoupler body 87, which is fitted into the tube body 82 and forms a light guide path that guides light of the light-emitting element 67. Even if optical components have different functions, if the optocoupler body 87 is formed in common for the optical components, the optical components can be joined to the tube body 82 regardless of the type.

The cover 65 is integrally linked to the main body 64 by means of the living hinge 66. Due to the cover 65 being integrally molded with the main body 64, the production cost is reduced.

Figure 13:
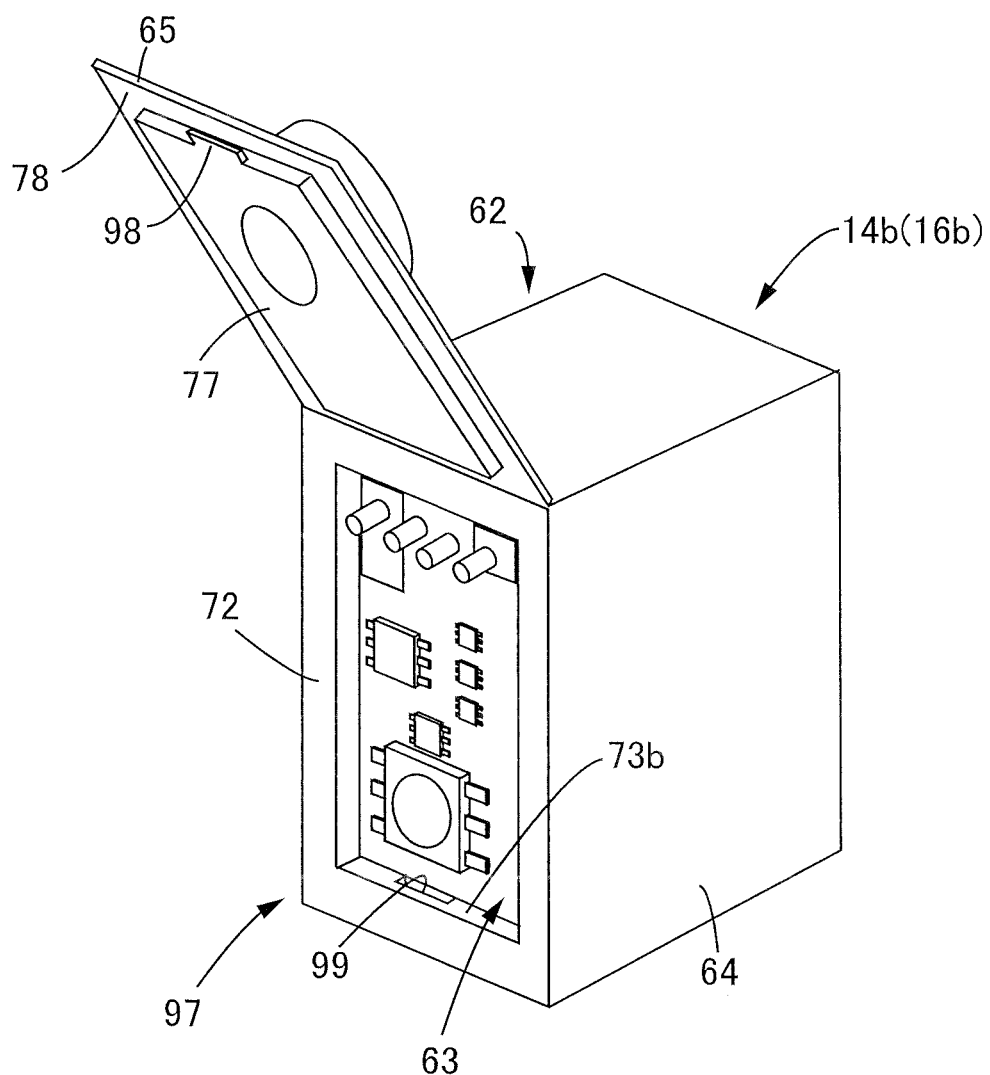
FIG. 13 is an enlarged partial perspective view schematically showing the arrangement of an engagement mechanism.

As shown in FIG. 13, an engagement mechanism 97 may be disposed between the main body 64 and the cover 65 in the holder 62. Here, the engagement mechanism 97 has for example a projection 98 that is disposed on an end face of the thick plate piece 77 that is the furthest from the living hinge 66 and a recess 99 that is disposed in the first wall face 73b of the surrounding wall 72, which is the furthest from the living hinge 66. The projection 98 projects from the end face at a position spaced from the superimposing piece 78 by a defined distance. The recess 99 is recessed from the mating face 75 at a position spaced from the mating face 75 by a defined distance. When the thick plate piece 77 of the cover 65 is fitted into the inside of the surrounding wall 72, for example, the projection 98 can enter the recess 99 in response to elastic deformation of the surrounding wall 72. In this way, in accordance with engagement between the projection 98 and the recess 99 the cover 65 is retained at a closed position. Engagement of the projection 98 and the recess 99 can be released in response to elastic deformation of the surrounding wall 72. In this way, opening and closing of the cover 65 is realized.

(4) Illuminating Device Related to Fourth Embodiment

Figure 14:
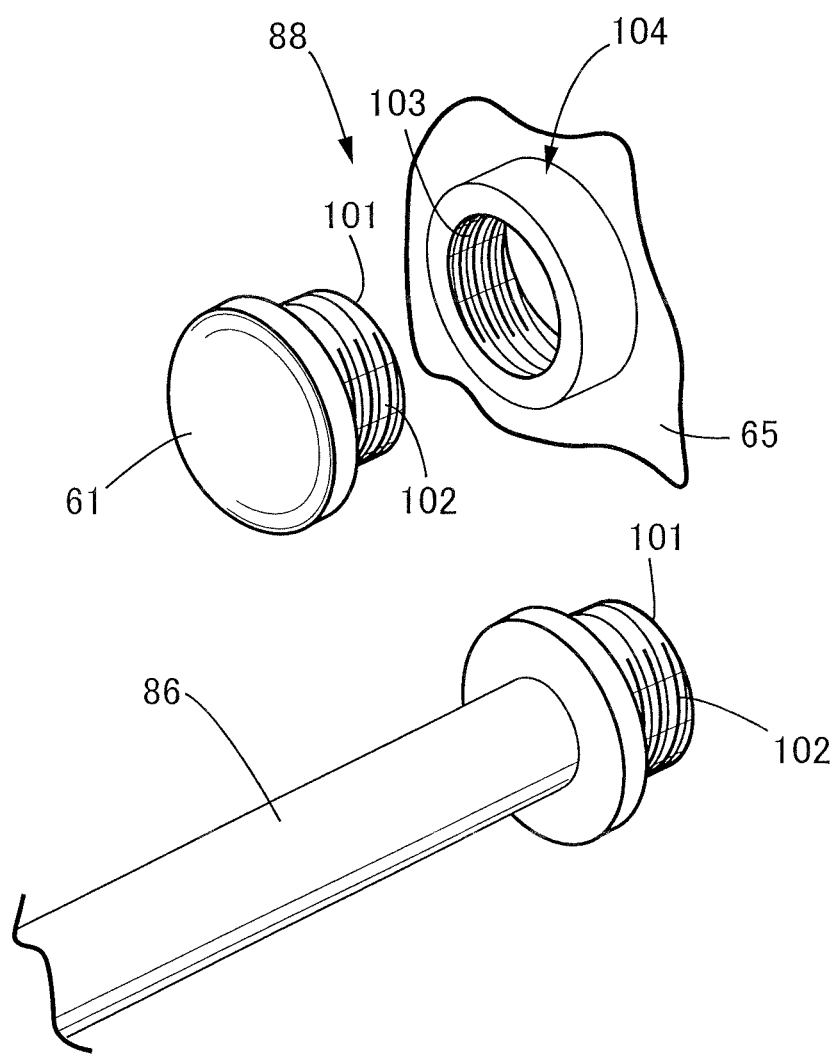
FIG. 14 is an enlarged perspective view, corresponding to FIG. 12, schematically showing the arrangement of an attachment/detachment mechanism related to another specific example in an illuminating device related to a fourth embodiment.

FIG. 14 schematically shows the arrangement of the attachment/detachment mechanism 88 related to another embodiment. The cover 65 has a tube body 104 that surrounds the opening 81 and has on an inner peripheral face a female thread 103 that meshes with a male thread 102 of an optocoupler body 101. The structure is otherwise the same as that of the first illuminating device 14b and the second illuminating device 16b described above. An optical component such as the lens 61 or the light guide pipe 86 can be strongly mounted on the cover 65 based on a screw structure. Even if optical components have different functions, if the optocoupler body 101 is formed in common on the optical components, the optical components can be joined to the tube body 104 regardless of the type.

(5) Illuminating Device Related to Fifth Embodiment

Figure 15:
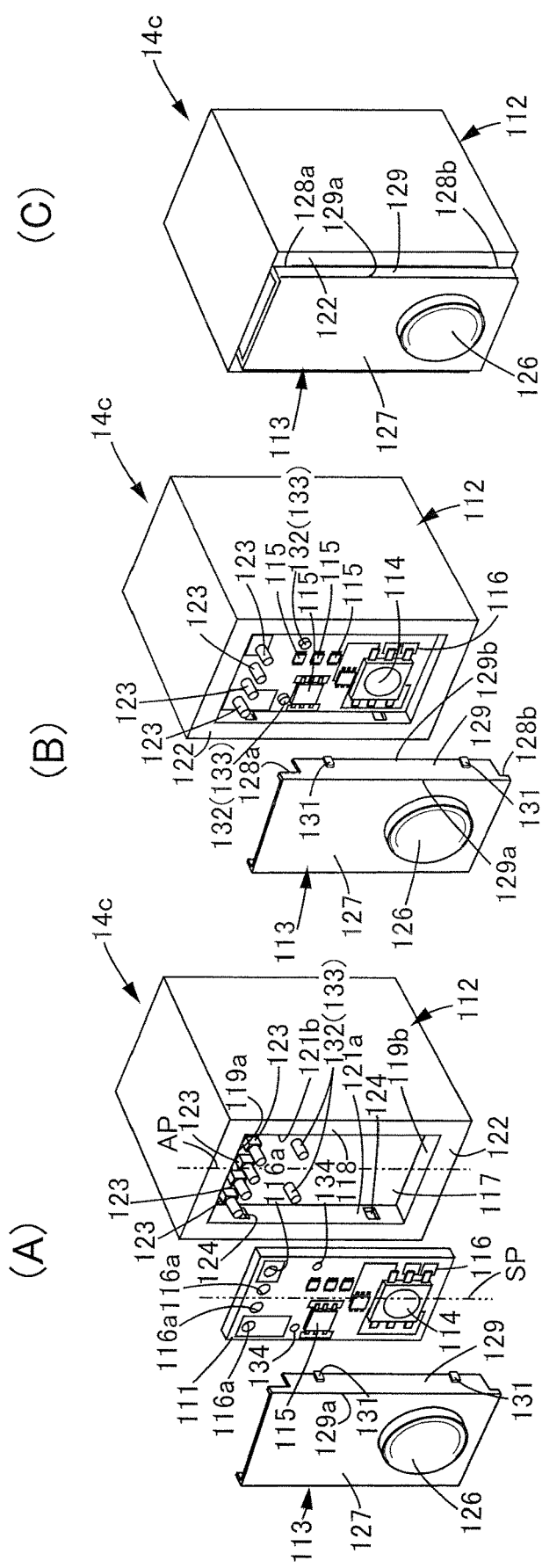
FIGS. 15(A)-15(C) schematically show the arrangement of a first illuminating device related to a fifth embodiment, in which FIG. 15 (A) is an exploded perspective view, FIG. 15 (B) is a perspective view in which a cover is removed, and FIG. 15 (C) is an overall perspective view.

As shown in FIG. 15, a first illuminating device 14c includes a rectangular column-shaped holder 112 supporting a circuit board 111, and a cover 113 embedded in the holder 112 and sandwiching the circuit board 111 between itself and the holder 112. The holder 112 and the cover 113 are formed from for example an insulating resin molding. The holder 112 is fixed to a material forming the door trim 12.

One light-emitting element 114 and one or more electronic components 115 contributing to light emission of the light-emitting element 114 are mounted on the front face of the circuit board 111. The light-emitting element 114 and the electronic component 115 are for example soldered to a wiring pattern 116. When carrying out soldering, for example a reflow step is employed. The light-emitting element 114 is formed from for example an LED (light-emitting diode) element. The LED element performs for example surface emission.

The wiring pattern 116 includes a plurality of (here, four) through holes 116a. The through hole 116a is formed from a conductive wall that is continuous from a conductive material of the wiring pattern 116 and surrounds for example a columnar space. The substrate of the circuit board 111 is molded from for example an insulating resin material or a ceramic material.

The holder 112 has a bottom face (support face) 117 that is formed as a plane and supports the reverse face of the circuit board 111, and a surrounding wall 118 that surrounds the bottom face 117 and projects further forward than the bottom face 117. The bottom face 117 has a shape that is the same as the outline of the circuit board 111. The surrounding wall 118 has a pair of first wall faces 119a and 119b that are orthogonal to the bottom face 117 and face each other in the vertical direction, and a pair of second wall faces 121a and 121b that are orthogonal to the bottom face 117, face each other in the lateral direction, and connect the upper and lower first wall faces 119a and 119b to each other. A flat rectangular parallelepiped space that is in contact with the bottom face 117 is defined inside the surrounding wall 118.

Defined on the surrounding wall 118 is a mounting face 122 that spreads in parallel with the bottom face 117 at a position spaced from the bottom face 117 by a specific distance and surrounds the entire periphery of the bottom face 117. A space surrounded by the surrounding wall 118 forms a depression with respect to the mounting face 122. When the circuit board 111 is housed in the depression and the reverse face of the circuit board 111 is superimposed via the entire face on the bottom face 117, the first wall faces 119a and 119b and the second wall faces 121a and 121b make contact with the outer edge of the four sides of the circuit board 111, thus enabling parallel movement of the circuit board 111 in a direction perpendicular to the bottom face 117 to be guided. The holder 112 supports the reverse face of the circuit board 111 by means of the bottom face 117. The bottom face 117 functions as a support face supporting the reverse face of the circuit board 111.

Four conductive terminals 123 project from the bottom face 117. The conductive terminal 123 includes for example a power supply terminal or a signal terminal. The conductive terminal 123 is formed from a linear-shaped conductive material. Individual conductive terminals 123 include an extremity having a so-called press-fit shape. The placement of the four conductive terminals 123 reflects the sequence of the through holes 116a arranged on the front face of the circuit board 111. That is, the four conductive terminals 123 are plane-symmetrically disposed with respect to the plane of symmetry AP bisecting the bottom face 117. When the reverse face of the circuit board 111 is superimposed on the bottom face 117, the conductive terminal 123 extends through the through hole 116a. The conductive terminal 123 fixes the circuit board 111 to the bottom face by virtue of the action of press-fitting.

Two, that is, upper and lower, cutouts 124 are defined in each of the second wall faces 121a and 121b. The cutout 124 is recessed from the second wall faces 121a and 121b. The cutout 124 has one end set off further on the bottom face 117 side than a virtual plane that is parallel to the bottom face 117 and is spaced from the bottom face 117 by a distance equal to the thickness of the circuit board 111, and has the other end set off at a position spaced toward the open end side by a specific distance from such a virtual plane.

The cover 113 has a decorative plate 127 equipped with a lens 126. The lens 126 is for example integrated with the decorative plate 127. The cover 113 is optically transparent at least for the lens 126 portion. The decorative plate 127 includes an upper edge region 128a that covers the mounting face 122 on the upper side of the holder 112, and a lower edge region 128b that covers the mounting face 122 on the lower side of the holder 112. Integrally formed with left and right edges of the decorative plate 127 between the upper edge region 128a and the lower edge region 128b is a plate-shaped mounting piece 129 that spreads perpendicularly to the rear from the decorative plate 127. The mounting piece 129 is connected to the edge of the decorative plate 127 via one ridge line 129a and allows a predetermined elastic deformation.

Two, that is, upper and lower, projecting bodies 131 are formed on the outer face of the mounting piece 129. The projecting bodies 131 are disposed at positions corresponding to the individual cutouts 124 of the holder 112. When the cover 113 is fitted into the holder 112, the mounting piece 129 is in contact with the corresponding second wall faces 121a and 121b via a plane. The projecting bodies 131 enter the respective corresponding cutouts 124. The projecting body 131 engages with the cutout 124 and prevents the cover 113 from falling out from the holder 112. A rear end 129b of the mounting piece 129 extends in parallel with the ridge line 129a, makes contact with the front face of the circuit board 111, and sandwiches the circuit board 111 between itself and the bottom face 117 of the holder 112.

The first illuminating device 14c includes a heat dissipating body 132 that is formed from a material having a higher thermal conductivity than that of the holder 112 and is fixed to the holder 112. The heat dissipating body 132 forms a columnar piece (projecting part) 133 that projects from a face receiving the circuit board 111. The columnar piece 133 is formed as a pair that are disposed symmetrically with respect to the plane of symmetry AP bisecting the front face of the bottom face 117. The heat dissipating body 132 may be molded from a metal material such as for example copper or aluminum.

A receiving hole 134 is formed in the circuit board 111 so as to correspond to the columnar piece 133. The receiving hole 134 is disposed at a position displaced from the wiring pattern 116. The receiving hole 134 is disposed at a position spaced from the light-emitting element 114 by a distance that is shorter than the distance between the light-emitting element 114 and the through hole 116a. The receiving hole 134 is formed as a pair that are symmetrically disposed with respect to the plane of symmetry SP bisecting the front face of the circuit board 111. The columnar piece 133 of the heat dissipating body 132 is received by the receiving hole 134. The outer periphery of the columnar piece 133 is in intimate contact with an inner wall face of the receiving hole 134. The columnar piece 133 may be press fitted into the receiving hole 134. The columnar piece 133 may have an extremity having a press-fit shape.

Figure 16:
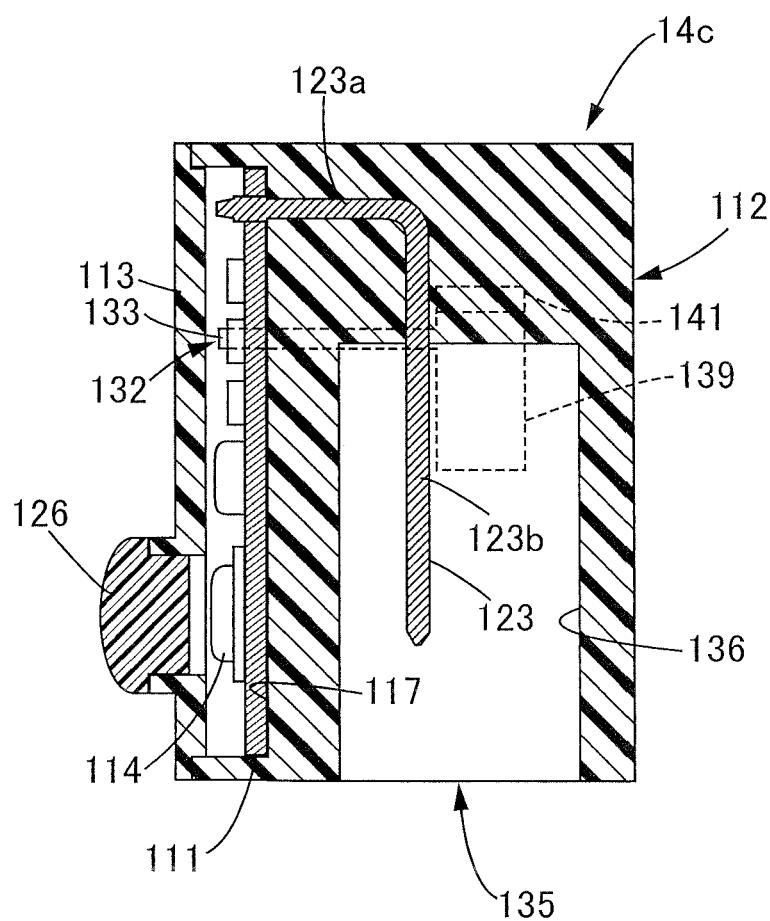
FIG. 16 is an enlarged vertical sectional view of the first illuminating device.

As shown in FIG. 16, the holder 112 supports the reverse face of the circuit board 111 via the bottom face 117. Here, the circuit board 111 is superimposed via the entire face on the bottom face 117 of the holder 112. The light-emitting element 114 is covered by the lens 126. Light of the light-emitting element 114 is made to spread by means of the lens 126.

A connector 135 is established on the holder 112. The connector 135 is formed as a female connector. The connector 135 defines a space 136 that receives a male connector. The individual conductive terminals 123 project into the space 136. The conductive terminal 123 has a first linear portion 123a that projects from the bottom face 117 and extends perpendicular to the bottom face 117, and a second linear portion 123b that bends from the first linear portion 123a and extends within the space 136 in parallel with the bottom face 117. The conductive terminal 123 is embedded in the holder 112. When being embedded, for example insertion molding is employed. A male connector joined to the wire harness 18 is inserted into the connector 135. The male connector may be joined to the connector 135 detachably.

The heat dissipating body 132 is embedded in the holder 112. The heat dissipating body 132 is fixed to the holder 112 based on insertion molding. The heat dissipating body 132 has an extended part 139 connected to the columnar piece 133 and having a larger surface area than that of the columnar piece 133. The extended part 139 may for example be embedded within the holder 112. The extended parts 139 are connected to each other within the holder 112. The heat dissipating body 132 includes a linking body 141 that is continuous from the extended part 139 and links the extended parts 139 to each other.

As shown in FIG. 17, the second illuminating device 16c is formed similarly to the first illuminating device 14c. However, in the second illuminating device 16c, instead of the lens 126 a light guide pipe 143 is joined to a cover 142. The light guide pipe 143 is formed as a pipe having a circular cross section. The light guide pipe 143 for example guides light in the linear direction and also radiates light in the radial direction of each cross section. The light guide pipe 143 provides linear illumination. Other than the light guide pipe 143 the arrangement is the same as that of the first illuminating device 14c.

The operation of the present embodiment is now explained. When carrying out assembly, the light-emitting element 114 and the electronic component 115 are mounted on the front face of the circuit board 111. The circuit board 111 is incorporated into the holder 112. When incorporated, the circuit board 111 is aligned with the surrounding wall 118 of the holder 112. The reverse face of the circuit board 111 is made to face the bottom face 117 of the holder 112. The through holes 116a are positioned so as to correspond to the individual conductive terminals 123. Similarly, the columnar pieces 133 of the heat dissipating bodies 132 are positioned with respect to the individual receiving holes 134. When the circuit board 111 is pushed into the inside of the surrounding wall 118, movement of the circuit board 111 is guided along the first wall faces 119a and 119b or the second wall faces 121a and 121b. The conductive terminal 123 projects out from the corresponding through hole 116a. Conductive connection is ensured between the conductive terminal 123 and the through hole 116a. The columnar piece 133 of the heat dissipating body 132 projects out from the receiving hole 134 of the circuit board 111. The columnar piece 133 makes intimate contact with the substrate of the circuit board 111. The circuit board 111 is fixed to the holder 112 by virtue of the action of press-fitting.

Subsequently, the cover 113 is fitted into the holder 112. The mounting piece 129 of the cover 113 is positioned on the inside of the surrounding wall 118 of the holder 112. Upper and lower ends of the mounting piece 129 are guided by the first wall faces 119a and 119b of the surrounding wall 118. When the cover 113 is pushed in toward the holder 112, while elastically deforming inwardly the mounting piece 129 makes the projecting body 131 enter the cutout 124 of the second wall faces 121a and 121b. When the rear end 129b of the mounting piece 129 abuts against the front face of the circuit board 111, the projecting body 131 engages with the cutout 124. In this way, the cover 113 is mounted on the holder 112. The circuit board 111 is sandwiched between the holder 112 and the cover 113.

In the present embodiment, the heat dissipating body 132 is fixed to the holder 112. The heat dissipating body 132 is formed from a material that has a higher thermal conductivity than that of the holder 112. Heat generated based on the electrical resistance of the light-emitting element 114 is transferred from the circuit board 111 to the holder 112 along the heat dissipating body 132 and is dissipated from the holder 112. The heat dissipating body 132 promotes heat transfer from the circuit board 111 to the holder 112. Since the heat dissipating body 132 makes contact with the circuit board 111 at a position displaced from the wiring pattern 116, short circuiting of the wiring can be avoided.

The heat dissipating body 132 has the columnar piece 133, which projects from the bottom face 117 of the holder 112 and is received by the receiving hole 134 disposed in the circuit board 111. The heat dissipating body 132 may be formed with a simple arrangement. The columnar piece 133 can be useful for positioning the circuit board 111.

The receiving hole 134 is disposed at a position spaced from the light-emitting element 114 by a distance that is shorter than the distance between the light-emitting element 114 and the through hole 116a. Efficient dissipation of heat from the light-emitting element 114 is therefore realized.

The receiving hole 134 is formed as a pair that are disposed symmetrically with respect to the plane of symmetry SP bisecting the front face of the circuit board 111. Efficient dissipation of heat from the light-emitting element 114 is therefore realized.

The heat dissipating bodies 132, apart from the columnar piece 133, are connected to each other. Since the heat dissipating bodies 132 are integrated into one, compared with a case in which they are arranged individually, the heat dissipating bodies 132 can be arranged easily. The ease of assembly is improved.

The heat dissipating body 132 has the extended part 139, which is connected to the columnar piece 133 and has a larger surface area than that of the columnar piece 133. Heat can be dissipated efficiently from the extended part 139.

The heat dissipating body 132 is embedded in the holder 112. Heat of the heat dissipating body 132 can be transferred efficiently to the holder 112. In this way, the dissipation of heat from the light-emitting element 114 can be further promoted. Since the heat dissipating body 132 is fixed to the holder 112 based on insertion molding, the heat dissipating body 132 can easily be fixed to the holder 112.

(6) Illuminating Device Related to Sixth Embodiment

Figure 18:
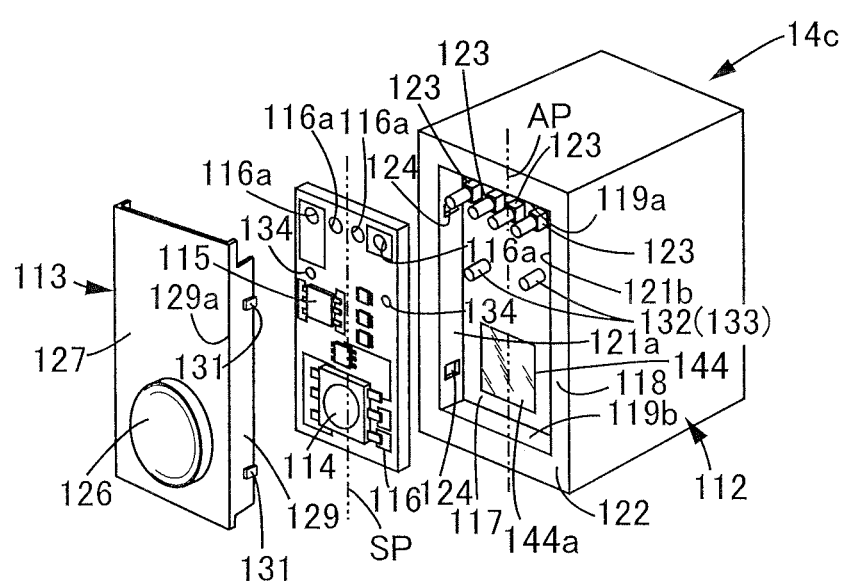
FIG. 18 is an overall schematic diagram of a holder schematically showing a heat dissipating body related to another specific example in an illuminating device related to a sixth embodiment.
Figure 19:
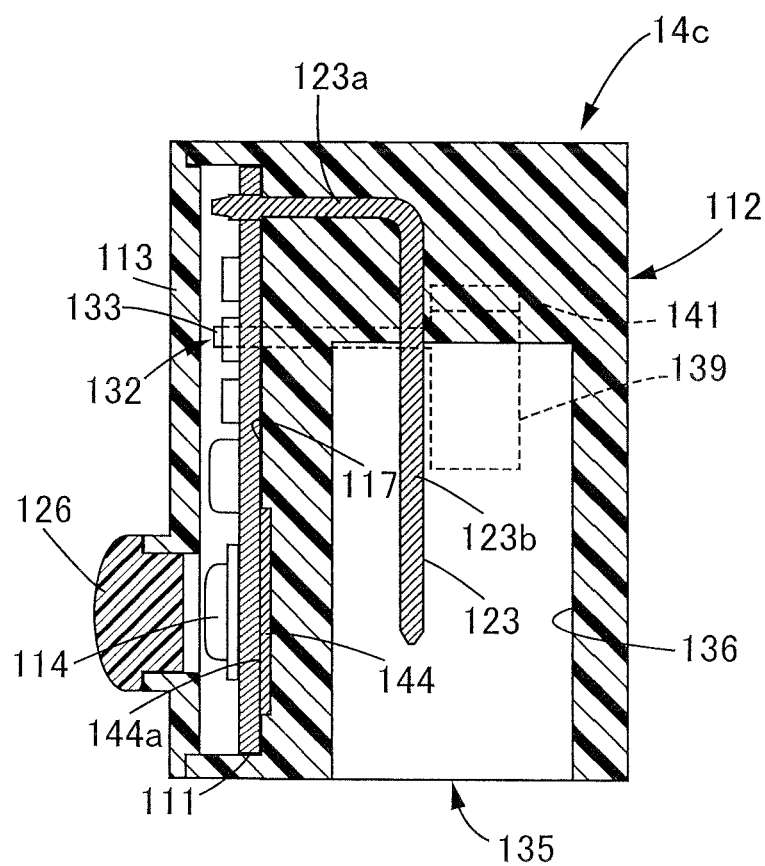
FIG. 19 is an enlarged vertical sectional view of a first illuminating device schematically showing a heat dissipating body related to another specific example.

FIG. 18 schematically shows a heat dissipating body 144 related to another embodiment. The heat dissipating body 144 has a front face 144a that spreads flush with the bottom face 117 of the holder 112. The heat dissipating body 144 is embedded in the holder 112. The heat dissipating body 132 is fixed to the holder 112 based on insertion molding. The circuit board 111 makes contact with the heat dissipating body 144 via the reverse side of the light-emitting element 114. The heat dissipating body 132 makes contact with the reverse face of the circuit board 111 over a wide area. In this way, the efficient dissipation of heat from the circuit board 111 is realized.

In the present embodiment, since the circuit board 111 makes contact with the heat dissipating body 144 via the reverse side of the light-emitting element 114, the heat dissipation properties can be enhanced. Since the heat dissipating body 144 is embedded in the holder 112, heat of the heat dissipating body 132 is efficiently transferred to the holder 112. Since the heat dissipating body 144 is fixed to the holder 112 based on insertion molding, the heat dissipating body 144 can easily be fixed to the holder 112.

The invention claimed is:

1. An illuminating device comprising:
   a circuit board that has wiring patterns on a first face and a second face thereof, the second face being on a reverse side of the first face, a light-emitting element that is mounted on one of the first face and the second face of the circuit board and has a height projecting from the one face of the circuit board, and a holder that includes a bottom face and a surrounding wall surrounding the bottom face, the holder supporting the other of the first and second faces of the circuit board at a position that is lower than the height of the light-emitting element, wherein the other face of the first and second faces of the circuit board is placed, via its wiring pattern, in contact with the bottom face of the holder, and wherein part of the wiring pattern on the other face functions as a bypass circuit.

2. The illuminating device according to claim 1, wherein the wiring pattern has through holes connected thereto, the through holes being symmetrically disposed with respect to a plane of symmetry that bisects the one face of the circuit board and being connected to conductive terminals.

3. The illuminating device according to claim 2, wherein one of said conductive terminals projects further than the bottom face that supports the other face of the circuit board.

4. The illuminating device according to claim 3, wherein the one of said conductive terminals includes an extremity that has a press-fit shape.

5. The illuminating device according to claim 4, further comprising a cover that is fitted into the holder and sandwiches the circuit board between the cover and the holder.

6. The illuminating device according to claim 3, wherein the one of said conductive terminals has a first linear portion that projects through the bottom face into the holder, and a second linear portion that bends from the first linear portion and extends substantially parallel with the bottom face into a space formed inside of the holder.

7. The illuminating device according to claim 3, wherein the one of said conductive terminals is embedded in the holder.

8. The illuminating device according to claim 1, further comprising an optical component that is detachably mounted in an opening disposed in front of the light-emitting element in the holder covering the first one face of the circuit board.

9. The illuminating device according to claim 1, comprising a heat dissipating body that is formed from a material having a higher thermal conductivity than a thermal conductivity of the holder, is fixed to the holder, and is in contact with the circuit board at a position displaced from the wiring pattern.

10. The illuminating device according to claim 1, wherein the circuit board comprises:
a substrate,
a first wiring pattern as the wiring pattern disposed on the one face of the substrate and realizes a first function in combination with a mounted electronic component,
a second wiring pattern as the wiring pattern disposed on the other face on the reverse side of the one face and realizes, in combination with another mounted electronic component, a second function that is different from the first function, and
a via that extends through the substrate and connects the first wiring pattern and the second wiring pattern to each other.

* * * * *